US012730556B2

(12) United States Patent
Yan

(10) Patent No.: US 12,730,556 B2
(45) Date of Patent: Sep. 8, 2026

(54) INPUT INTERFACE DISPLAY METHOD AND TERMINAL

(71) Applicant: Huawei Technologies Co., Ltd., Shenzhen (CN)

(72) Inventor: Yulin Yan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 398 days.

(21) Appl. No.: 18/185,470

(22) Filed: Mar. 17, 2023

(65) Prior Publication Data

US 2023/0221862 A1 Jul. 13, 2023

Related U.S. Application Data

(63) Continuation of application No. PCT/CN2021/118822, filed on Sep. 16, 2021.

(30) Foreign Application Priority Data

Sep. 22, 2020 (CN) ........................ 202011003834.X

(51) Int. Cl.
*G06F 3/04886* (2022.01)
*G06F 3/0481* (2022.01)
*G06F 3/0484* (2022.01)

(52) U.S. Cl.
CPC ........ *G06F 3/04886* (2013.01); *G06F 3/0481* (2013.01); *G06F 3/0484* (2013.01)

(58) Field of Classification Search
CPC .................................................. G06F 3/04886
USPC ................................. 715/773, 753; 345/169
See application file for complete search history.

(56) References Cited

U.S. PATENT DOCUMENTS

2013/0307783 A1* 11/2013 Park .................... G06F 3/04886 345/169
2014/0009415 A1* 1/2014 Nishida ................. G06F 3/0416 345/173
2016/0048274 A1* 2/2016 Rosenberg .......... G06F 3/04847 715/753
2020/0012801 A1* 1/2020 Porteret ................ H04W 12/68
(Continued)

FOREIGN PATENT DOCUMENTS

CN 107566632 A 1/2018
CN 110248027 A 9/2019
(Continued)

*Primary Examiner* — Ruay Ho
(74) *Attorney, Agent, or Firm* — Slater Matsil, LLP

(57) ABSTRACT

An input interface display method and a terminal are provided, and relate to the field of terminal technologies. When a terminal is switched to a one-handed input mode, a problem of poor user experience caused by a cumbersome setting operation of a user is solved. A specific solution includes: A terminal receives a first wake-up operation, determines target input keys in a currently displayed input interface in response to the first wake-up operation when determining that the terminal meets a wake-up condition, and then displays the target input keys at an associated position of a first side in the input interface. The input interface includes a plurality of input keys. The target input keys include keys whose distances from the first side are greater than a preset distance in the plurality of input keys. The first wake-up operation corresponds to the first side.

20 Claims, 34 Drawing Sheets

(56) References Cited

U.S. PATENT DOCUMENTS

| | | | | |
|---|---|---|---|---|
| 2020/0410477 | A1* | 12/2020 | Terra | G06Q 20/352 |
| 2021/0216192 | A1* | 7/2021 | Ono | G06F 3/0483 |

FOREIGN PATENT DOCUMENTS

| | | | | | |
|---|---|---|---|---|---|
| WO | WO-2011096204 | A1 * | 8/2011 | | A63F 13/02 |
| WO | WO-2013174341 | A2 * | 11/2013 | | G06F 1/1626 |
| WO | WO-2019051846 | A1 * | 3/2019 | | G06F 3/0484 |
| WO | WO-2020165399 | A1 * | 8/2020 | | G05B 19/0428 |
| WO | WO-2020181955 | A1 * | 9/2020 | | |

* cited by examiner

CMCC
08:08
SMS/MMS
Emm I You Okay am
q w e r t y u i o p
a s d f g h j k l
z x c v b n m
?123
Chinese/ English
,
space
。

FIG. 1C

CONT. FROM FIG. 13A

TO FIG. 13C

CONT. FROM FIG. 19A

TO FIG. 19C

CONT. FROM

CONT. FROM FIG. 21A

TO FIG. 21C

CONT. FROM FIG. 21B

INPUT INTERFACE DISPLAY METHOD AND TERMINAL

CROSS-REFERENCE TO RELATED APPLICATIONS

This application is a continuation of International Application No. PCT/CN2021/118822, filed on Sep. 16, 2021, which claims priority to Chinese Patent Application No. 202011003834.X, filed on Sep. 22, 2020. The disclosures of the aforementioned applications are hereby incorporated by reference in their entireties.

TECHNICAL FIELD

This application relates to the field of terminal technologies, and in particular, to an input interface display method and a terminal.

BACKGROUND

With rapid development of terminal technologies, screens of terminals such as mobile phones are becoming increasingly large. Therefore, in a one-handed input scenario, it is increasingly difficult for a user to operate. In a one-handed input scenario, for example, when a user inputs an address of a destination into a terminal with one hand during driving, or when a user uses a terminal to send a message with one hand when the other hand is busy, a finger of the user cannot accurately touch a local key in an input interface, which leads to poor user experience and a risk of mobile phone slipping.

To resolve the foregoing problems, current terminals support switching from a conventional input mode to a one-handed input mode. The user may select "Interface setting" in a setting interface, select "one-handed mode setting" in an interface of the interface setting, and then select a left-handed input mode or a right-handed input mode in a displayed prompt box, to complete setting of the one-handed input mode. After the user completes the setting, the terminal may shrink the keyboard toward a side when displaying an input interface, to facilitate the operation of the user. For example, after the user sets the right-handed input mode, the terminal may shrink the keyboard toward the right when displaying the input interface. However, because setting of the one-handed input mode is complex, user experience is still poor.

SUMMARY

This application provides an input interface display method and a terminal, and resolves a problem of poor user experience caused by a cumbersome setting operation of a user to switch a terminal to a one-handed input mode.

To achieve the foregoing objective, this application uses the following technical solutions.

According to a first aspect, an input interface display method is provided. A terminal receives a first wake-up operation, determines target input keys in a currently displayed input interface in response to the first wake-up operation when determining that the terminal meets a wake-up condition, and then displays the target input keys at an associated position of a first side in the input interface. The input interface includes a plurality of input keys. The target input keys include keys whose distances from the first side are greater than a preset distance in the plurality of input keys. The first wake-up operation corresponds to the first side.

The first side corresponds to the first wake-up operation, and is a side that is closer to a hand of the user. The target input keys are keys that are in the input interface and that are away from the first side, that is, keys that cannot be accurately touched by the user during a one-handed operation. When receiving the first wake-up operation and determining that the terminal meets the wake-up condition, the terminal may obtain and display the target input keys. Because the user needs only to perform the first wake-up operation to switch the terminal to the one-handed input mode, the operation of the user is simplified and user experience is improved when compared with complex setting operations in a conventional technology.

Optionally, in a possible implementation of this application, a method for the "determining that the terminal meets a wake-up condition" may include: The terminal obtains a screen display status of the terminal, content included in the input interface, and an on/off status of an edge display function, and determines that the terminal meets the wake-up condition when determining that the screen display status is a screen-on state, that the input interface includes the plurality of input keys and no target input key, and that the on/off status of the edge display function is an on state.

After receiving the first wake-up operation, a mobile phone determines the target input keys only when determining that the mobile phone meets the wake-up condition. In this case, determining and displaying the target input keys situation makes sense. Otherwise, the mobile phone does not meet the wake-up condition, for example, the screen display status is a screen-locked state. In this case, the input interface cannot be displayed, and determining the target input keys does not make sense.

Optionally, in another possible implementation of this application, a method for the "displaying the target input keys at an associated position of a first side in the input interface" may include: The terminal displays the target input keys in a floating input box at the associated position of the first side in the input interface.

Optionally, in another possible implementation of this application, a display type of the floating input box is at least one of the following: single-column display, multi-column display, arc-shaped display, hollow circle display, semi-circle display, and quarter circle display.

Optionally, in another possible implementation of this application, when the target input keys include a function key, the input interface display method provided in this application may further include: The terminal receives a trigger operation for a target function key, and in response to the trigger operation, switches the target input keys from a current display style to a target display style, and simultaneously switches the plurality of input keys from the current display style to the target display style. The target function key is any function key in the target input keys, or any function key in the plurality of input keys.

The display style of the target input keys is switched synchronously with that of the plurality of input keys to ensure that the display style of the target input keys is consistent with that of the plurality of input keys. Compared with separate display style switching, the user operation is simple and user experience is better.

Optionally, in another possible implementation of this application, the input interface display method provided in this application may further include: The terminal receives a first landscape/portrait orientation switching operation, determines a current landscape/portrait orientation status of the input interface in response to the first landscape/portrait orientation switching operation, and then performs an operation of switching a landscape/portrait orientation mode of the input interface based on the landscape/portrait orientation status. The landscape/portrait orientation status is a landscape orientation state or a portrait orientation state, and the input interface displays the target input keys. An input interface after the switching displays the target input keys.

Optionally, in another possible implementation of this application, the input interface display method provided in this application may further include: The terminal receives a second landscape/portrait orientation switching operation, and determines a current landscape/portrait orientation status of the input interface in response to the second landscape/portrait orientation switching operation. The landscape/portrait orientation status is a landscape orientation state or a portrait orientation state, and the input interface displays the target input keys. Then, the terminal performs an operation of switching a landscape/portrait orientation mode of the input interface based on the landscape/portrait orientation status. An input interface after the switching does not display the target input keys. In addition, the terminal receives a second wake-up operation, and in response to the second wake-up operation, displays the target input keys at an associated position of a second side in the input interface after the switching. The second wake-up operation corresponds to the second side.

After the mobile phone displays the target input keys in the input interface, the user may perform the landscape/portrait orientation switching operation in the input interface. In this scenario, the mobile phone may determine, based on different landscape/portrait orientation switching operations, whether the user keeps the one-handed input mode or switches to a two-handed input mode in the input interface after the switching. In addition, the mobile phone may determine, based on a determining result, whether to display the target input keys in the input interface after the switching.

Optionally, in another possible implementation of this application, after the displaying the target input keys, the input interface display method provided in this application may further include: The terminal receives an exit operation for the target input keys, and stops, in response to the exit operation, displaying the target input keys when determining that the terminal meets an exit condition.

In this way, the user needs only to perform the exit operation to enable the terminal to switch from the one-handed input mode to the two-handed input mode. The operation of the user is simplified and user experience is improved.

Optionally, in another possible implementation of this application, the method for "determining that the terminal meets an exit condition" may include: The terminal obtains a screen display status of the terminal, content included in the input interface, and an on/off status of an edge display function, and determines that the terminal meets the exit condition when determining that the screen display status is the screen-on state, that the input interface includes the target input keys, and that the on/off status of the edge display function is the on state.

Optionally, in another possible implementation of this application, after the displaying the target input keys, the input interface display method provided in this application may further include: The terminal receives a position switching operation, and switches, in response to the position switching operation, the target input keys from the associated position of the first side to an associated position of a third side, where the third side is another side of the terminal other than the first side, and the position switching operation corresponds to the third side.

In this way, the mobile phone switches a display position of the target input keys based on an actual situation, so that the target input keys are displayed at a position that can be accurately touched by the user to facilitate an input operation of the user. User experience is better.

According to a second aspect, a terminal is provided. The terminal includes modules configured to perform the input interface display method according to the first aspect or any possible implementation of the first aspect.

According to a third aspect, a terminal is provided. The terminal includes a memory and a processor. The memory is coupled with the processor. The memory is configured to store computer program code, where the computer program code includes computer instructions. When the processor executes the computer instructions, the terminal performs the input interface display method according to the first aspect and any possible implementation of the first aspect.

According to a fourth aspect, a chip system is provided. The chip system is applied to a terminal. The chip system includes one or more interface circuits and one or more processors. The interface circuit and the processor are interconnected by using a line. The interface circuit is configured to receive a signal from a memory of the terminal, and send the signal to the processor. The signal includes computer instructions stored in the memory. When the processor executes the computer instructions, the terminal performs the input interface display method according to the first aspect and any possible implementation of the first aspect.

According to a fifth aspect, a computer-readable storage medium is provided. The computer-readable storage medium includes computer instructions. When the computer instructions are run on a terminal, the terminal is enabled to perform the input interface display method according to the first aspect and any possible implementation of the first aspect.

According to a sixth aspect, this application provides a computer program product. The computer program product includes computer instructions. When the computer instructions are run on a terminal, the terminal is enabled to perform the input interface display method according to the first aspect and any possible implementation of the first aspect.

For detailed descriptions of the second aspect to the sixth aspect and various implementations thereof in this application, refer to detailed descriptions of the first aspect and the various implementations thereof. In addition, for beneficial effects of the second aspect to the sixth aspect and the various implementations thereof, refer to the analysis of beneficial effects of the first aspect and the various implementations thereof. Details are not described herein again.

These aspects or other aspects in this application are more concise and comprehensible in the following descriptions.

BRIEF DESCRIPTION OF THE DRAWINGS

FIG. 1A to FIG. 1C are a schematic diagram of setting of a one-handed input mode according to a conventional technology;

DETAILED DESCRIPTION OF ILLUSTRATIVE EMBODIMENTS

In addition, in embodiments of this application, the terms such as "an example" or "for example" are used to represent examples, illustrations, or explanations. Any embodiment or design solution described as "an example" or "for example" in the embodiments of this application shall not be interpreted to be more preferential or advantageous than other embodiments or design solutions. To be precise, the terms such as "an example" or "for example" are intended to present a related concept in a specific manner.

In the following, the terms "first" and "second" are used merely for descriptive purposes, and cannot be understood as indicating or implying relative importance or implicitly indicating the quantity of indicated technical features. Therefore, a feature limited by "first" or "second" may explicitly or implicitly include one or more features. In the description of the embodiments of this application, unless otherwise specified, "a plurality of" means two or more.

Figure 1A:
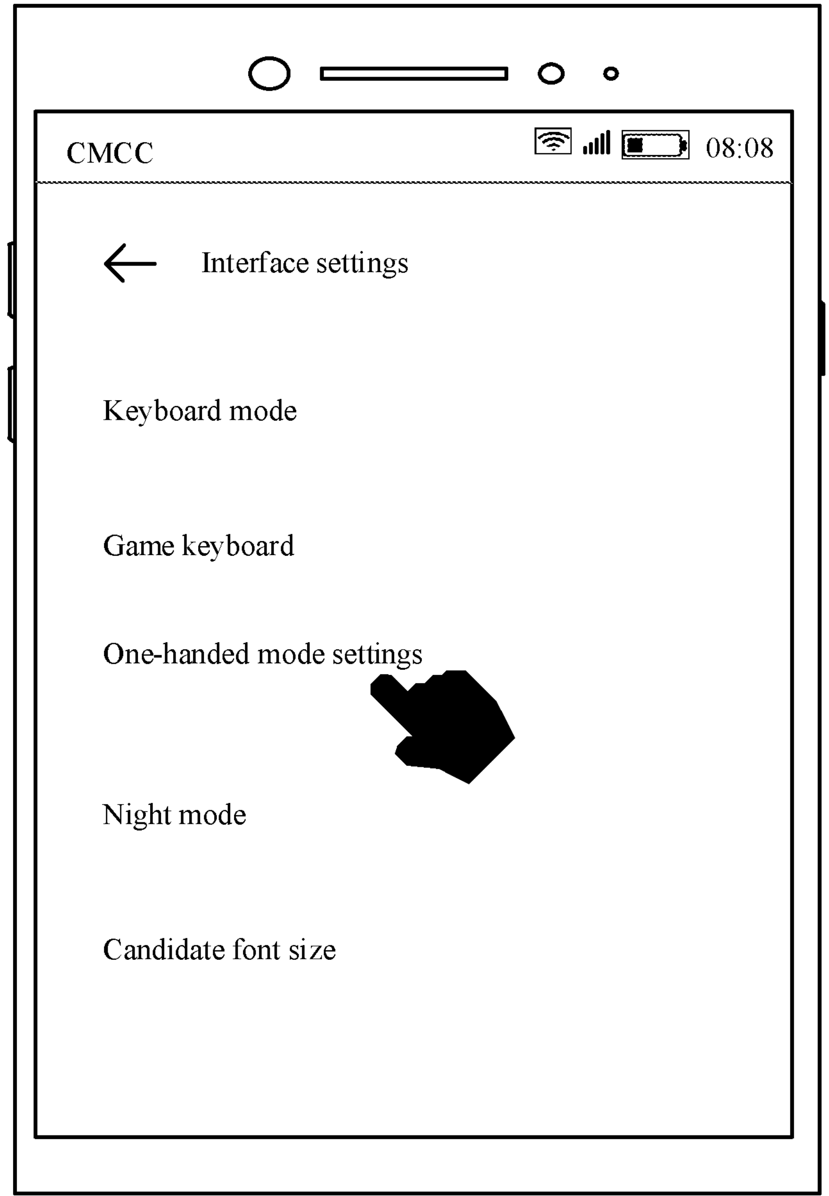
Figure 1B:
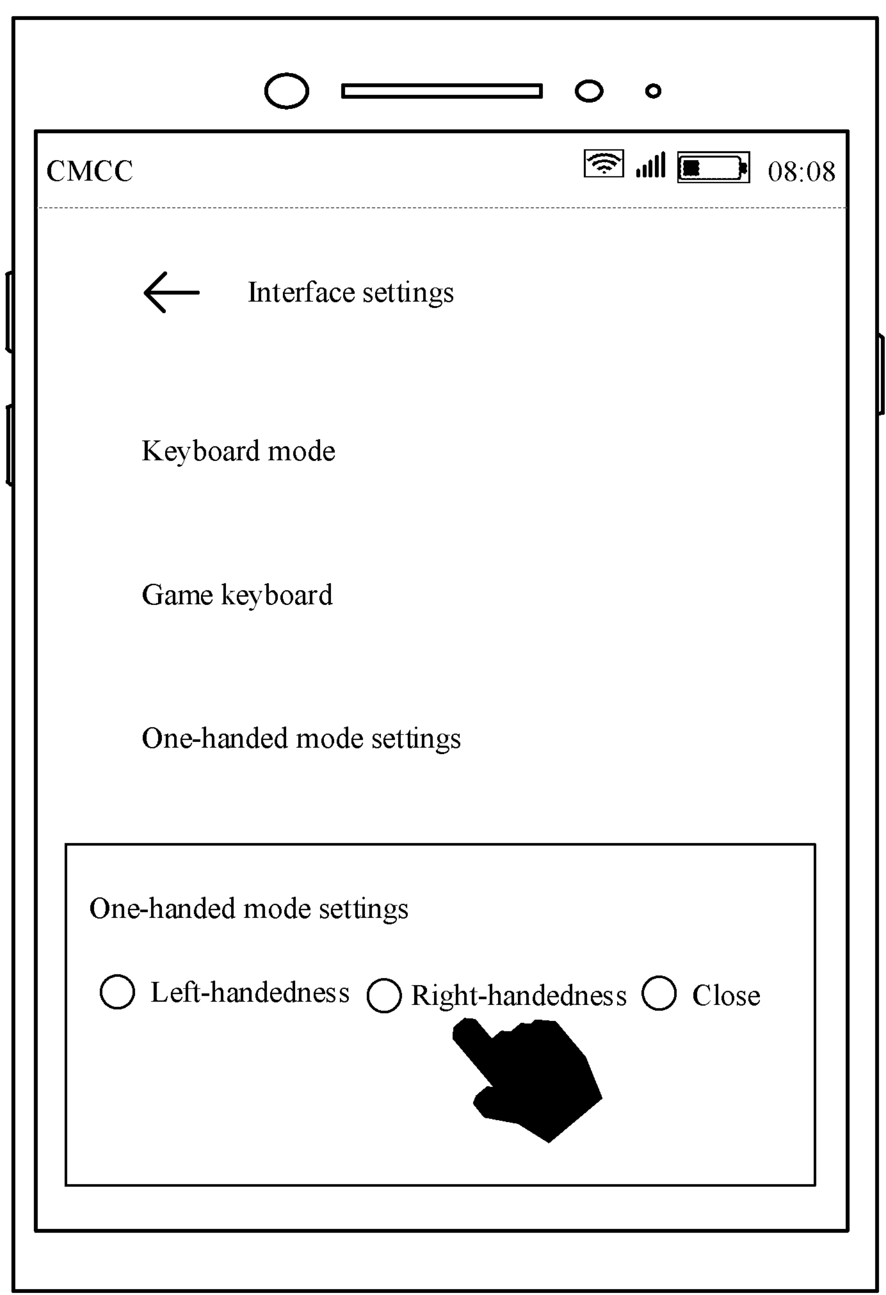
Figure 1C:
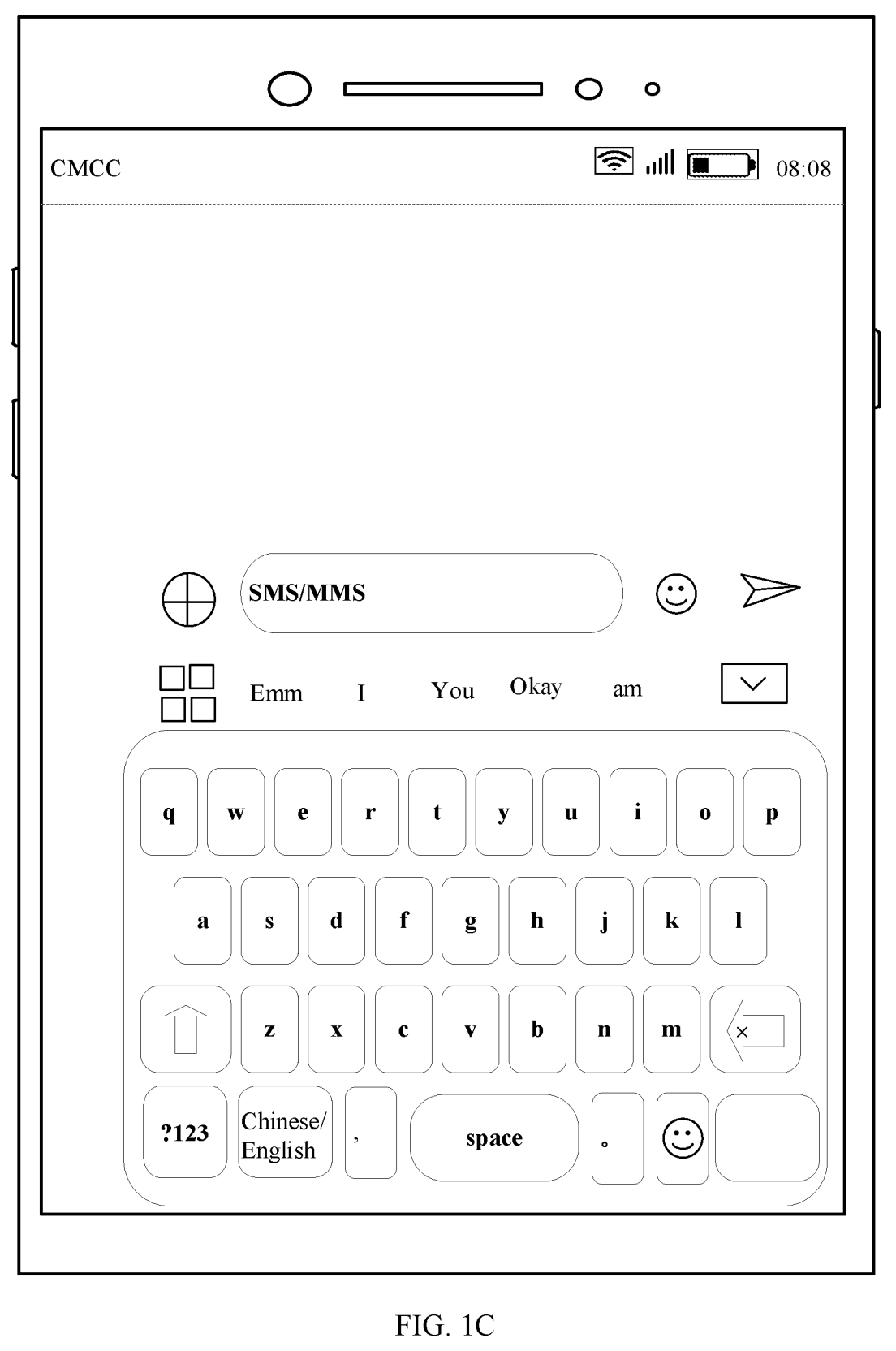

In a conventional technology, a terminal supports setting of a one-handed input mode. After the user selects "Interface setting" in a setting interface, the terminal may display an interface setting interface, as shown in FIG. 1A. After the user selects "one-handed mode setting" on the interface setting interface shown in FIG. 1A, the terminal may display a prompt box on the interface setting interface. As shown in FIG. 1B, the prompt box includes one-handed mode setting, for example, a left-handedness key and a right-handedness key. The prompt box may further include a close key. After the user selects the right-handedness key in the prompt box, the setting for the one-handed input mode is completed. In this way, as shown in FIG. 1C, on an input interface, for example, a short messaging service sending interface, the terminal may shrink a keyboard to the right to facilitate the operation of the user. However, because setting of the one-handed input mode is complex, user experience is still poor.

To simplify an operation of switching to the one-handed input mode and improve user experience, embodiments of this application provide an input interface display method and apparatus. Switching to the one-handed input mode may be implemented by means of only a wake-up operation, which facilitates the user operation.

The input interface display method provided in this embodiment of this application is executed by a terminal. In some embodiments, the terminal may be a mobile phone (mobile phone), a foldable device, a smart screen, a tablet computer, a notebook computer, an ultra-mobile personal computer (UMPC), a netbook, a personal digital assistant (PDA), a wearable device, a virtual reality (VR) device, an augmented reality (AR) device, or the like. In this embodiment of this application, an example in which a terminal is a mobile phone is used to describe an input interface display method provided in this embodiment of this application.

Figure 2:
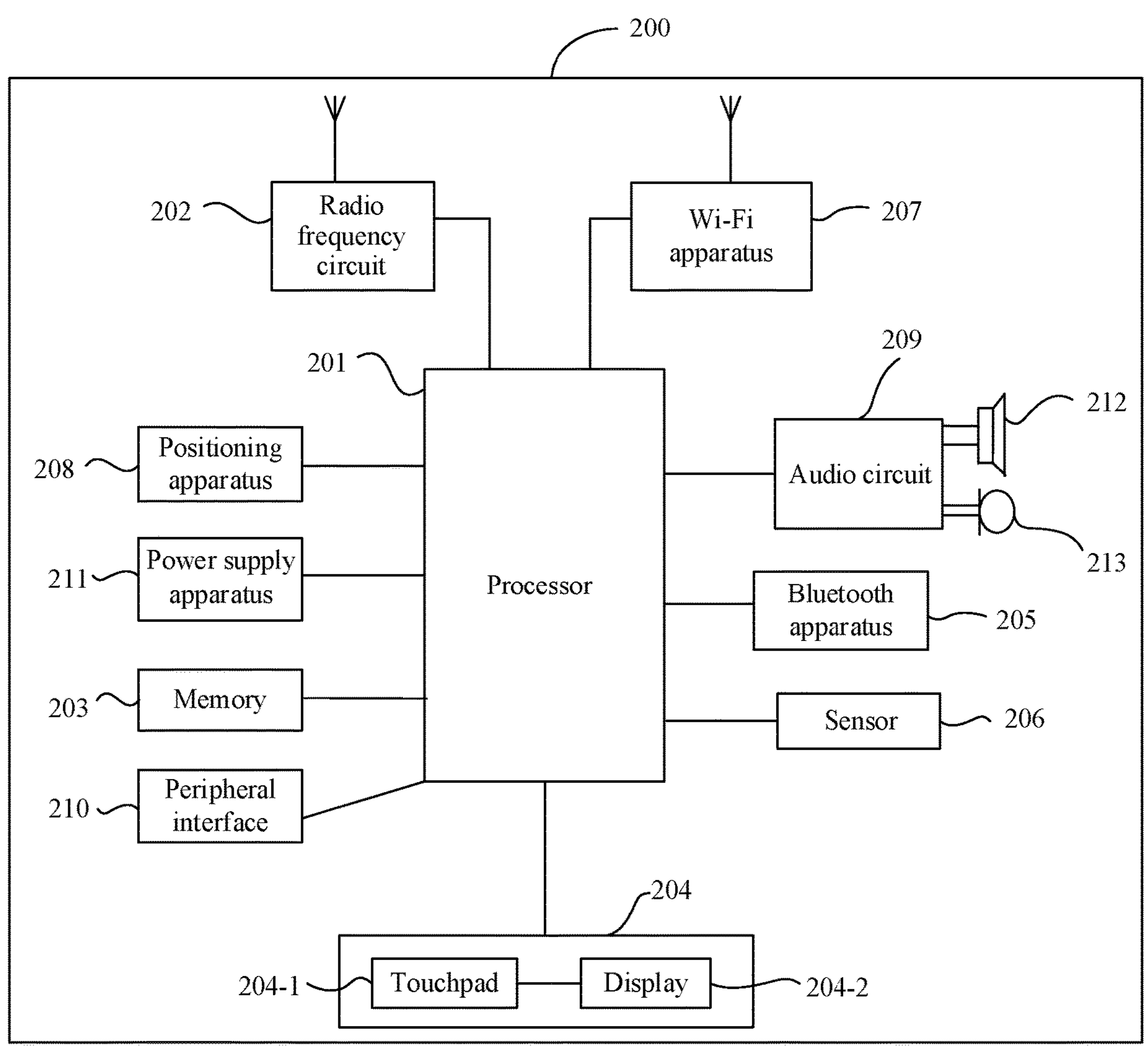
FIG. 2 is a schematic diagram of a structure of a mobile phone according to an embodiment of this application.

As shown in FIG. 2, a mobile phone 200 may specifically include components such as a processor 201, a radio frequency (RF) circuit 202, a memory 203, a touchscreen 204, a Bluetooth apparatus 205, one or more sensors 206, a wireless fidelity (Wi-Fi) apparatus 207, a positioning apparatus 208, an audio circuit 209, a peripheral interface 210, and a power supply apparatus 211. These components may perform communication by using one or more communication buses or signal lines (not shown in FIG. 2). A person skilled in the art may understand that a hardware structure shown in FIG. 2 does not constitute a limitation on the mobile phone 200. The mobile phone 200 may include more or fewer components than those shown in the figure, may combine some components, or may have different component arrangements.

The components of the mobile phone 200 are specifically described below with reference to FIG. 2.

As a control center of the mobile phone 200, the processor 201 is connected to all parts of the mobile phone 200 by using various interfaces and lines, and runs or executes an application program stored in the memory 203 and calls data stored in the memory 203 to perform various functions of the mobile phone 200 and process the data. In some embodiments, the processor 201 may include one or more processing units.

The radio frequency circuit 202 may be configured to receive and transmit a radio signal in an information receiving and transmitting process or a call process. Generally, the radio frequency circuit 202 includes but is not limited to an antenna, at least one amplifier, a transceiver, a coupler, a low-noise amplifier, a duplexer, and the like. In addition, the radio frequency circuit 202 may further communicate with another device by using wireless communication. Wireless communication may be implemented by using any communications standard or protocol, including but not limited to a global system for mobile communications, general packet radio service, code division multiple access, wideband code division multiple access, long term evolution, an email, short messaging service, and the like.

The memory 203 is configured to store the application program and the data. The processor 201 runs the application program and data that are stored in the memory 203 to perform various functions of the mobile phone 200 and data processing. The memory 203 mainly includes a program storage area and a data storage area. The program storage area may store an operating system, and an application program required by at least one function (such as an intention recognition function and an image processing function). The data storage area may store data (such as audio data and text information) created when the mobile phone 200 is used. In addition, the memory 203 may include a high-speed random access memory (RAM), may alternatively include a nonvolatile memory, for example, a disk storage device, a flash storage device, or another volatile solid state storage device. The memory 203 may store various operating systems, such as an iOS operating system and an Android operating system. The memory 203 may be independent, and is connected to the processor 201 by using the communications bus. Alternatively, the memory 203 may be integrated with the processor 201.

The touchscreen 204 may specifically include a touchpad 204-1 and a display 204-2.

The touchpad 204-1 may collect a touch event performed by a user of the mobile phone 200 on or near the touchpad 204-1 (for example, an operation performed by the user on the touchpad 204-1 or near the touchpad 204-1 by using any proper item such as a finger or a stylus), and send collected touch information to another device (for example, the processor 201). The touch event performed by the user near the touchpad 204-1 may be referred to as a floating touch. The floating touch means that the user needs only to be located near the device to perform a desired function, without directly touching the touchpad to select, move, or drag an object (such as an icon). In addition, the touchpad 204-1 may be implemented in a plurality of types, such as a resistive type, capacitive type, an infrared type, and a surface acoustic wave type.

The display (also referred to as a display screen) 204-2 may be configured to display information input by the user or information provided to the user, and various menus of the mobile phone 200. The display 204-2 may be configured in forms such as a liquid crystal display or organic light emitting diodes. The touchpad 204-1 may cover the display 204-2. After detecting a touch event on or near the touchpad 204-1, the touchpad 204-1 transmits the touch event to the processor 201 to determine a type of the touch event. Then, the processor 201 may provide corresponding visual output on the display 204-2 based on the type of the touch event. In FIG. 2, the touchpad 204-1 and the display screen 204-2 are used as two independent components to implement input and output functions of the mobile phone 200. However, in some embodiments, the touchpad 204-1 and the display screen 204-2 may be integrated to implement the input and output functions of the mobile phone 200. It may be understood that, the touchscreen 204 is formed by stacking a plurality of layers of materials. Only the touchpad (layer) and the display screen (layer) are shown in this embodiment of this application. Other layers are not described in this embodiment of this application. In addition, the touchpad 204-1 may be configured on the front of the mobile phone 200 in a form of a full panel, and the display screen 204-2 may also be configured on the front of the mobile phone 200 in the form of a full panel. In this way, a bezel-free structure may be implemented on the front of the mobile phone.

The mobile phone 200 may further include the Bluetooth apparatus 205 to exchange data between the mobile phone 200 and another short-range device (for example, a mobile phone or a smart watch). In this embodiment of this application, the Bluetooth apparatus 205 may be an integrated circuit, a Bluetooth chip, or the like.

The mobile phone 200 may further include at least one sensor 206, such as a light sensor, a motion sensor, a visual sensor, an auditory sensor, and another sensor. Specifically, the light sensor may include an ambient light sensor and a proximity sensor. The ambient light sensor may adjust luminance of the display of the touchscreen 204 based on brightness of ambient light. The proximity sensor may turn off a power supply of the display when the mobile phone 200 moves to an ear. As one type of the motion sensor, an accelerometer sensor may detect magnitudes of accelerations in various directions (usually on three axes). The accelerometer sensor may detect a magnitude and a direction of gravity when the mobile phone is still. The accelerometer sensor may be applied to mobile phone posture recognition (such as landscape/portrait orientation switching, a related game, and magnetometer posture calibration), functions related to vibration recognition (such as a pedometer and tapping), and the like. Other sensors such as a gyroscope, a barometer, a hygrometer, a thermometer, and an infrared sensor may be further configured in the mobile phone 200. Details are not described herein.

The Wi-Fi apparatus 207 is configured to provide the mobile phone 200 with network access that complies with a Wi-Fi related standard protocol. The mobile phone 200 may access a Wi-Fi access point by using the Wi-Fi apparatus 207 to assist the user in sending or receiving emails, browsing web pages, visiting streaming media, and the like. The Wi-Fi apparatus 207 provides the user with wireless broadband Internet access. In other embodiments, the Wi-Fi apparatus 207 may also be used as a Wi-Fi wireless access point, and may provide Wi-Fi network access for another device.

The positioning apparatus 208 is configured to provide a geographic position to the mobile phone 200. It may be understood that the positioning apparatus 208 may be specifically a receiver of a positioning system such as a global positioning system (GPS), a BeiDou navigation satellite system, or Russian GLONASS. After receiving the geographic position sent by the foregoing positioning system, the positioning apparatus 208 sends the information to the processor 201 for processing, or sends the information to the memory 203 for storage.

The audio circuit 209, a loudspeaker 212, and a microphone 213 may provide audio interfaces between the user and the mobile phone 200. The audio circuit 209 may convert received audio data into an electrical signal and transmit the electrical signal to the loudspeaker 212. The loudspeaker 212 converts the electrical signal into a sound signal for output. In addition, the microphone 213 converts the collected sound signal into an electrical signal. The audio circuit 209 receives the electrical signal, converts the electrical signal into audio data, and then outputs the audio data to the RF circuit 202, so that the audio data is sent to, for example, another mobile phone. Alternatively, the audio data is output to the memory 203 for further processing.

The peripheral interface 210 is configured to provide various interfaces for an external input/output device (such as a keyboard, a mouse, an external monitor, an external memory, or a subscriber identity module card). For example, the mouse is connected to a universal serial bus (USB) interface. A subscriber identification module (SIM) card provided by a telecommunications operator is connected to metal contacts on a subscriber identification module card slot. The peripheral interface 210 may be configured to couple the foregoing external input/output peripheral device to the processor 201 and the memory 203.

In this embodiment of this application, the mobile phone 200 may communicate with another device in a device group by using the peripheral interface 210. For example, display data sent by another device may be received by using the peripheral interface 210 and the display data is displayed. This is not limited in this embodiment of this application.

The mobile phone 200 may further include the power supply apparatus 211 (for example, a battery and a power management chip) that supplies power to the various components. The battery may be logically connected to the processor 201 by using the power management chip. In this way, functions such as charge management, discharge management, and power consumption management are implemented by using the power supply apparatus 211.

Although not shown in FIG. 2, the mobile phone 200 may further include a camera (a front-facing camera and/or a rear-facing camera), a flash, a micro projection apparatus, a near field communication (NFC) apparatus, and the like. Details are not described herein.

Based on the foregoing hardware structure of the mobile phone, an embodiment of this application provides an input interface display method. The following describes, with reference to the accompanying drawings, the input interface display method provided in this embodiment of this application.

It should be noted that, in this embodiment of this application, a touch operation performed by the user on the touchscreen may be an operation performed by the user on the touchscreen, or may be an operation performed by the user near the touchscreen, that is, a floating touch. In this embodiment of this application, the input interface display method provided in this embodiment of this application is described by using an operation performed by a user on a touchscreen as an example.

Figure 3:
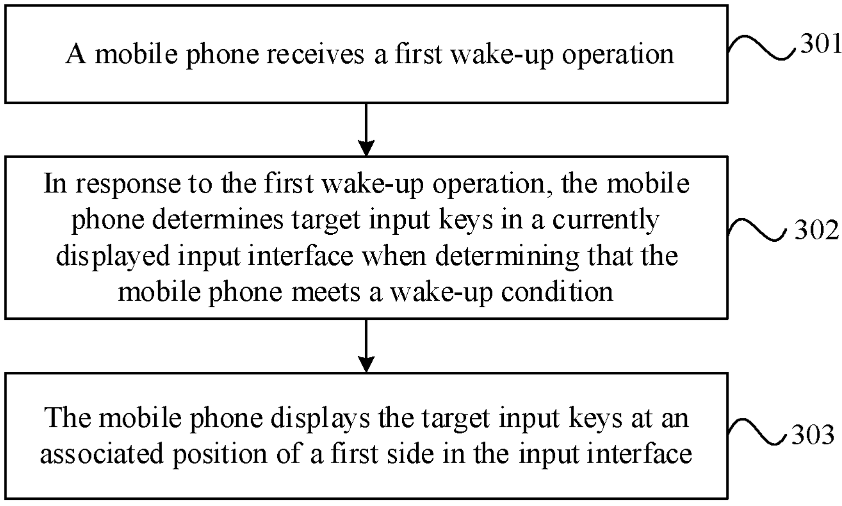
FIG. 3 is a schematic flowchart 1 of an input interface display method according to an embodiment of this application.

As shown in FIG. 3, the input interface display method may include the following step 301 to step 303.

301. A mobile phone receives a first wake-up operation.

When a user performs a first touch operation on a touchscreen of the mobile phone, a touchpad of the touchscreen may detect the first touch operation, and send collected information about the first touch operation to a processor of the mobile phone. After receiving the information about the first touch operation, the processor of the mobile phone may determine, according to the information about the first touch operation, whether the first touch operation is a wake-up operation. When determining that the first touch operation is a wake-up operation, the processor may determine that the first wake-up operation of the user is received.

In some embodiments, that the processor determines whether the first touch operation is a wake-up operation may be specifically: The processor determines whether a first gesture used by the user to perform the first touch operation is one of pre-stored wake-up gestures (the pre-stored wake-up gestures may be one gesture, or may include a plurality of gestures). When determining that the first gesture is one of the pre-stored wake-up gestures, the processor may determine that the first touch operation is the wake-up operation.

It may be understood that there are various types of the first gesture. The first gesture may be any one of the following gestures: a screen edge tap gesture, a screen edge squeeze gesture, a touch and hold gesture, an area change gesture, a multi-touch gesture, a slide gesture, a tangential gesture, a screen circle drawing gesture, a rotation gesture, a preset gesture for a physical key, and the like. Certainly, the first gesture may also be a combination of a plurality of gestures. The use of a combined gesture may reduce a possibility of an accidental touch of the user. For example, the first gesture may be a gesture of squeezing an edge of the screen and sliding downward. The pre-stored wake-up gestures may include at least one of the foregoing gestures.

The screen edge tap gesture may be a single tap operation performed by the user on a touchscreen edge, or a plurality of tap operations performed on a same touch object. The screen edge squeeze gesture may be a squeeze operation performed by the user on a touchscreen edge, where a pressure value reaches a preset threshold. The touch and hold gesture may be a touch and hold operation performed by the user on the touchscreen, where a time for touching the touchscreen reaches a preset threshold. The area change gesture may be a touch operation performed by the user on the touchscreen, where a touch area of the user on the touchscreen changes. The multi-touch gesture may be a touch operation performed by the user on the touchscreen, where multiple touch points exist. The slide gesture may be a slide operation performed by the user on the touchscreen, where a slide distance reaches a preset threshold. The tangential gesture may be a touch operation that is performed by the user on the touchscreen and has at least one of the following trends: an upward trend, a downward trend, a leftward trend, a rightward trend, and a rotation trend. The screen circle drawing gesture may be a circle drawing operation performed by the user on the touchscreen. The rotation gesture may be a touch operation performed by the user on the touchscreen to rotate the touchscreen. The preset gesture for the physical key may be a touch and hold operation performed by the user on a power key, a volume key, a fingerprint recognition key on the back of the mobile phone, or the like. The gesture of squeezing an edge of the screen and sliding downward may be: A user performs a squeeze operation on an edge of the touchscreen, and then performs a downward operation at the edge of the touchscreen after a pressure value reaches the preset threshold, where a sliding distance reaches the preset threshold.

Figure 4A:
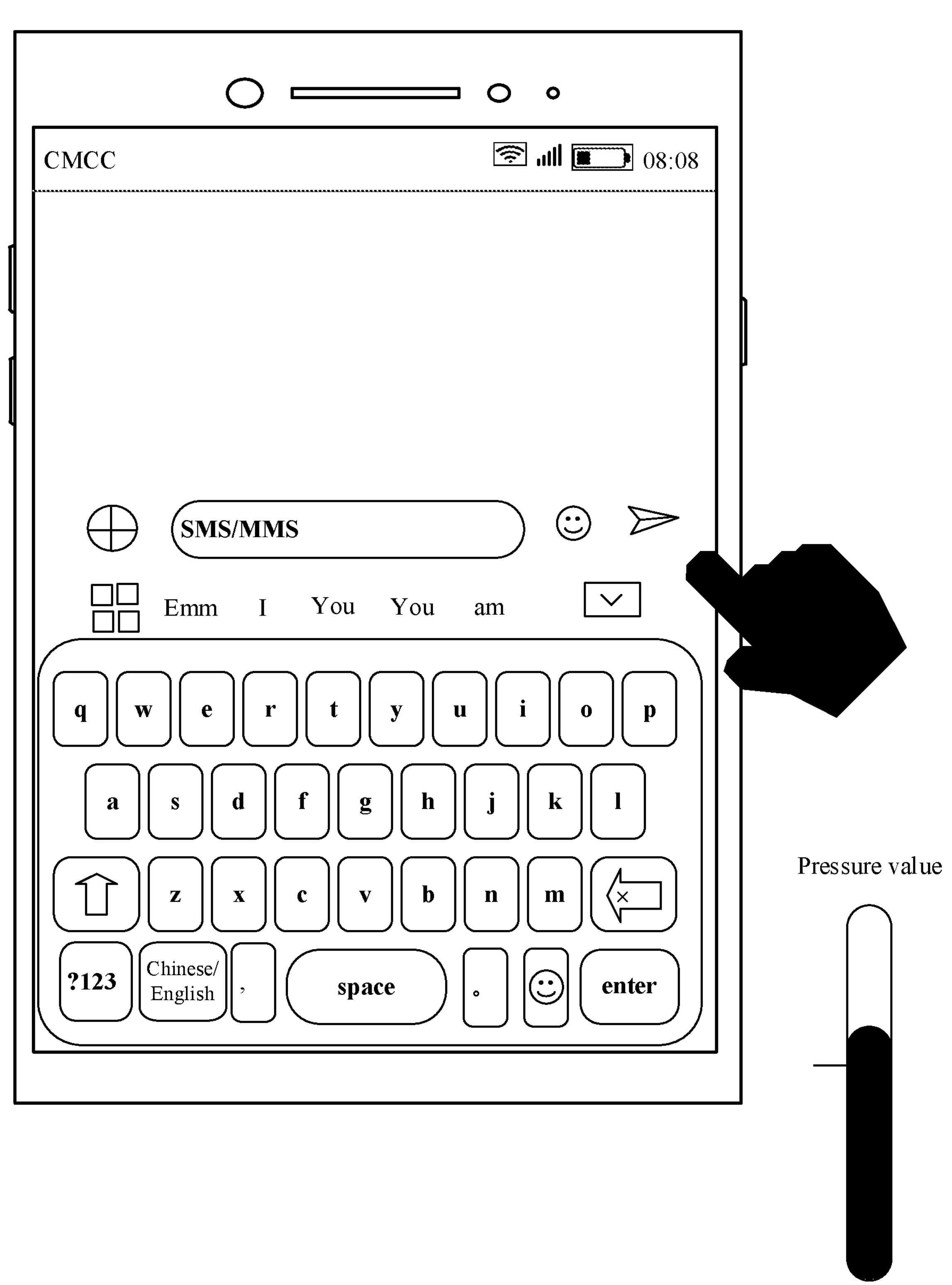
FIG. 4A and FIG. 4B are a schematic diagram 1 of a wake-up gesture according to an embodiment of this application.
Figure 4B:
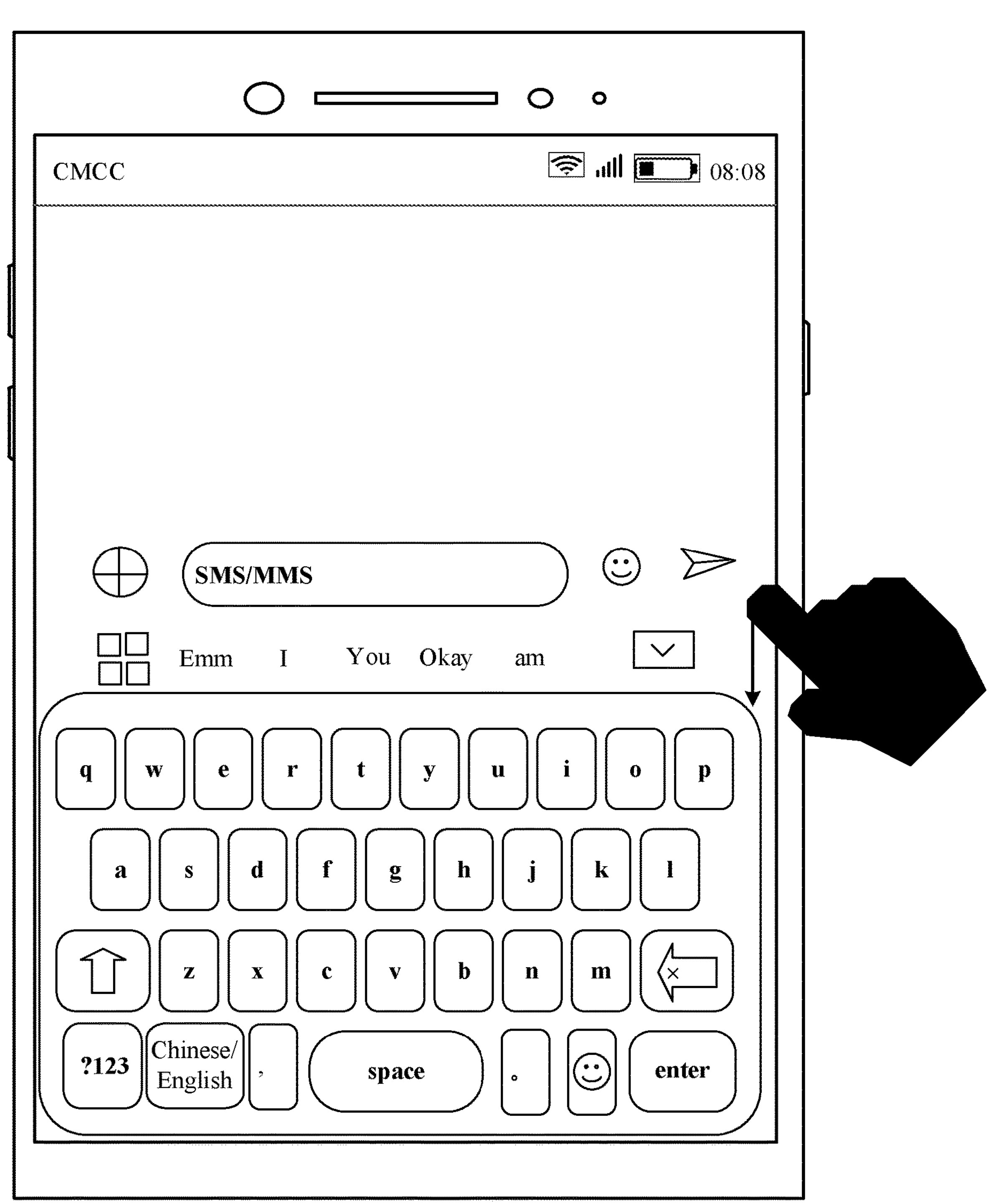

For example, FIG. 4A and FIG. 4B are a schematic diagram of a gesture of squeezing a right side edge of a screen and sliding downward. As shown in FIG. 4A, the user performs a squeeze operation on the right side edge of a touchscreen, where a pressure value reaches the preset threshold. As shown in FIG. 4B, the user performs a downward sliding operation on the right side edge of the touchscreen, where a sliding distance reaches the preset threshold.

Figure 5:
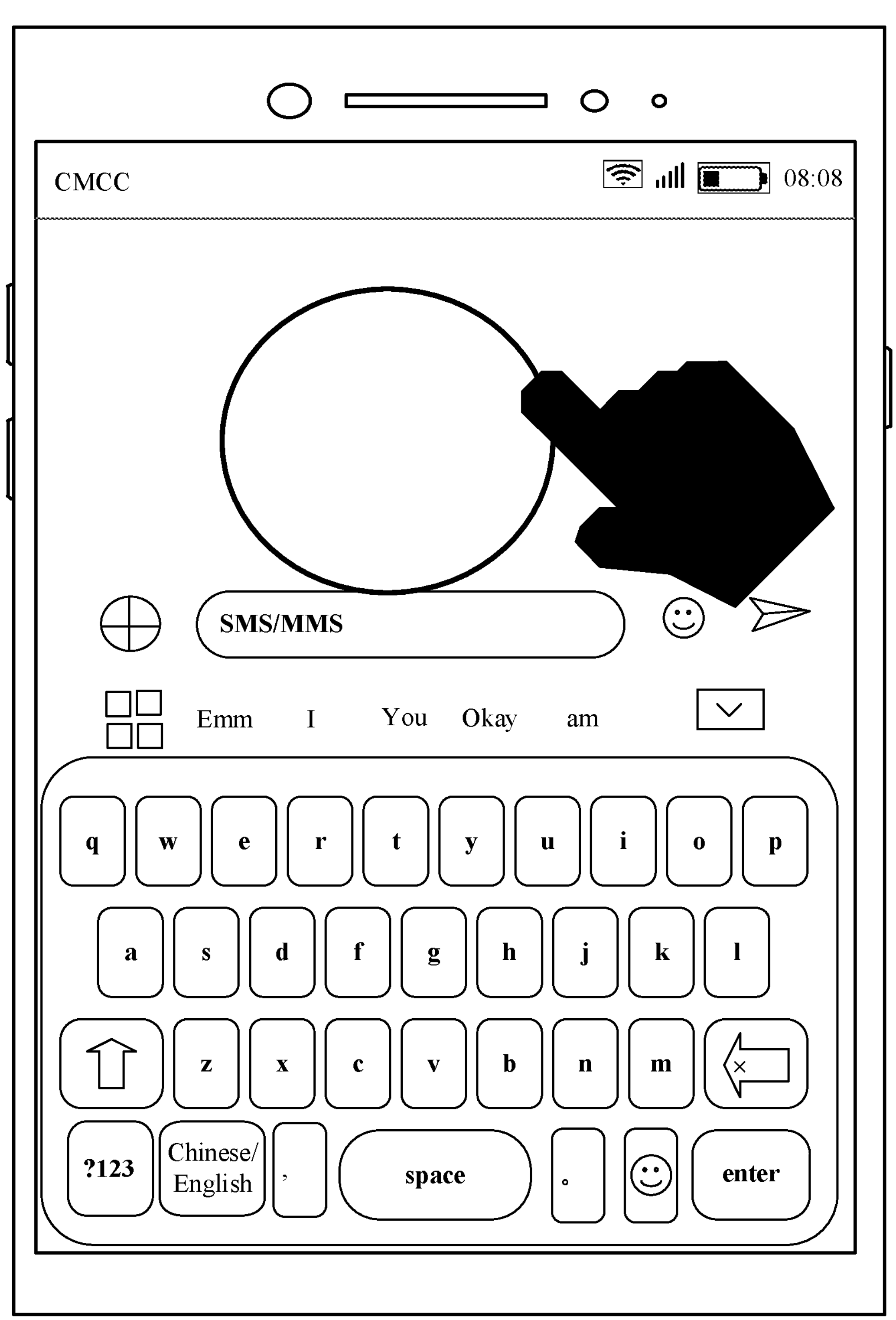
FIG. 5 is a schematic diagram 2 of a wake-up gesture according to an embodiment of this application.

For another example, FIG. 5 is a schematic diagram of a screen circle drawing gesture. As shown in FIG. 5, the user performs a circle drawing operation on a touchscreen.

In particular, in some scenarios, for some first gestures, such as the screen edge tap gesture, the screen edge squeeze gesture, the touch and hold gesture, the multi-touch gesture, the slide gesture, the tangential gesture, and the gesture of squeezing a right side edge of a screen and sliding downward, when determining whether the first touch operation is the wake-up operation, the mobile phone may determine that the first touch operation is the wake-up operation when determining that the first gesture is one of the pre-stored wake-up gestures and determining that the first gesture acts on a sensing region of the touchscreen. The sensing region is a preset region on the touchscreen. Generally, sensing regions may be disposed at the left side edge and the right side edge of the touchscreen. For different types of mobile phones, sizes of areas of the sensing regions may be different. For example, an area of a sensing region of a curved screen mobile phone is greater than that of a non-curved screen mobile phone.

In this way, the mobile phone determines that the first touch operation is the wake-up operation only when determining that the first gesture is the wake-up gesture and that the first gesture acts on the sensing region. In this way, a possibility of an accidental touch of the user may be reduced.

In addition, when the sensing region is disposed at the left side edge or the right side edge of the touchscreen, concentrations of holing regions of the user may be avoided, for example, regions in which the power key and the volume key are located, or a region in which the user is accustomed to holding the mobile phone. The possibility of the accidental touch of the user is reduced.

Figure 6:
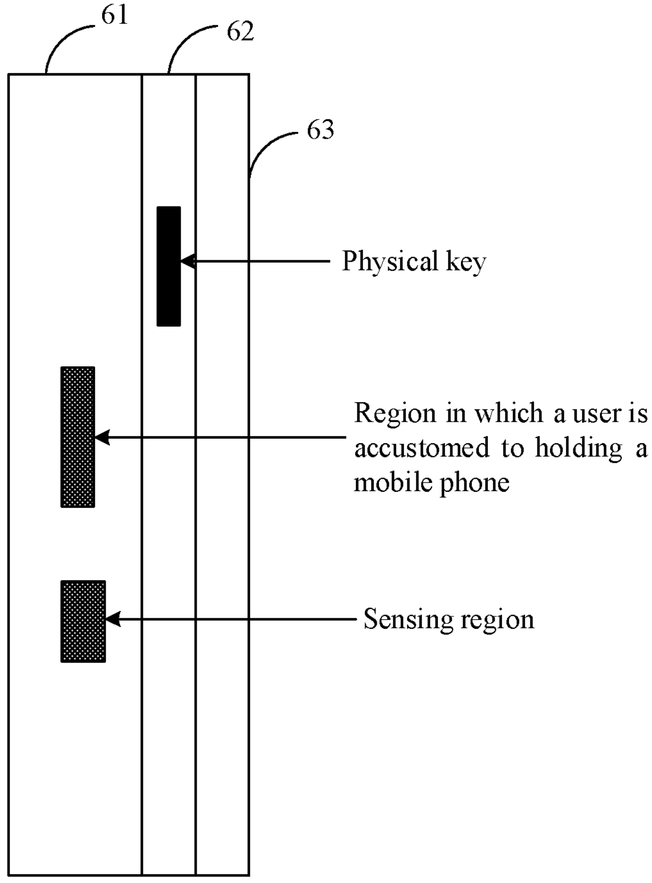
FIG. 6 is a schematic diagram of a sensing area at an edge of a touchscreen according to an embodiment of this application.

For example, FIG. 6 is a schematic diagram of a sensing region at an edge of a touchscreen. As shown in FIG. 6, a side surface of the mobile phone may include three parts: an edge 61 of a touchscreen, a middle frame 62, and a rear housing 63. The physical key, such as the power key, is usually disposed on the middle frame 62. The sensing region in FIG. 6 avoids the concentrations of holing regions of the user.

It should be noted that, in this embodiment of this application, the pre-stored wake-up gesture in the mobile phone may be a regular gesture, or may be preset by the user.

302. In response to the first wake-up operation, the mobile phone determines target input keys in a currently displayed input interface when determining that the mobile phone meets a wake-up condition.

The input interface includes a plurality of input keys. The target input keys include keys whose distances from a first side are greater than a preset distance in the plurality of input keys. The first wake-up operation corresponds to the first side.

After receiving the first wake-up operation, the mobile phone may determine, in response to the first wake-up operation, whether the mobile phone meets the wake-up condition. When determining that the mobile phone itself the wake-up condition, the mobile phone may determine the target input keys in the input interface currently displayed. When determining that the mobile phone does not meet the wake-up condition, the mobile phone may end the operation.

Optionally, in this embodiment of this application, a specific process in which the mobile phone determines the target input keys in the input interface currently displayed is as follows: The mobile phone first determines the first side corresponding to the first wake-up operation, and then determines keys whose distances from the first side are greater than the preset distance in the plurality of input keys included in the input interface, that is, determines the target input keys.

Figure 7:
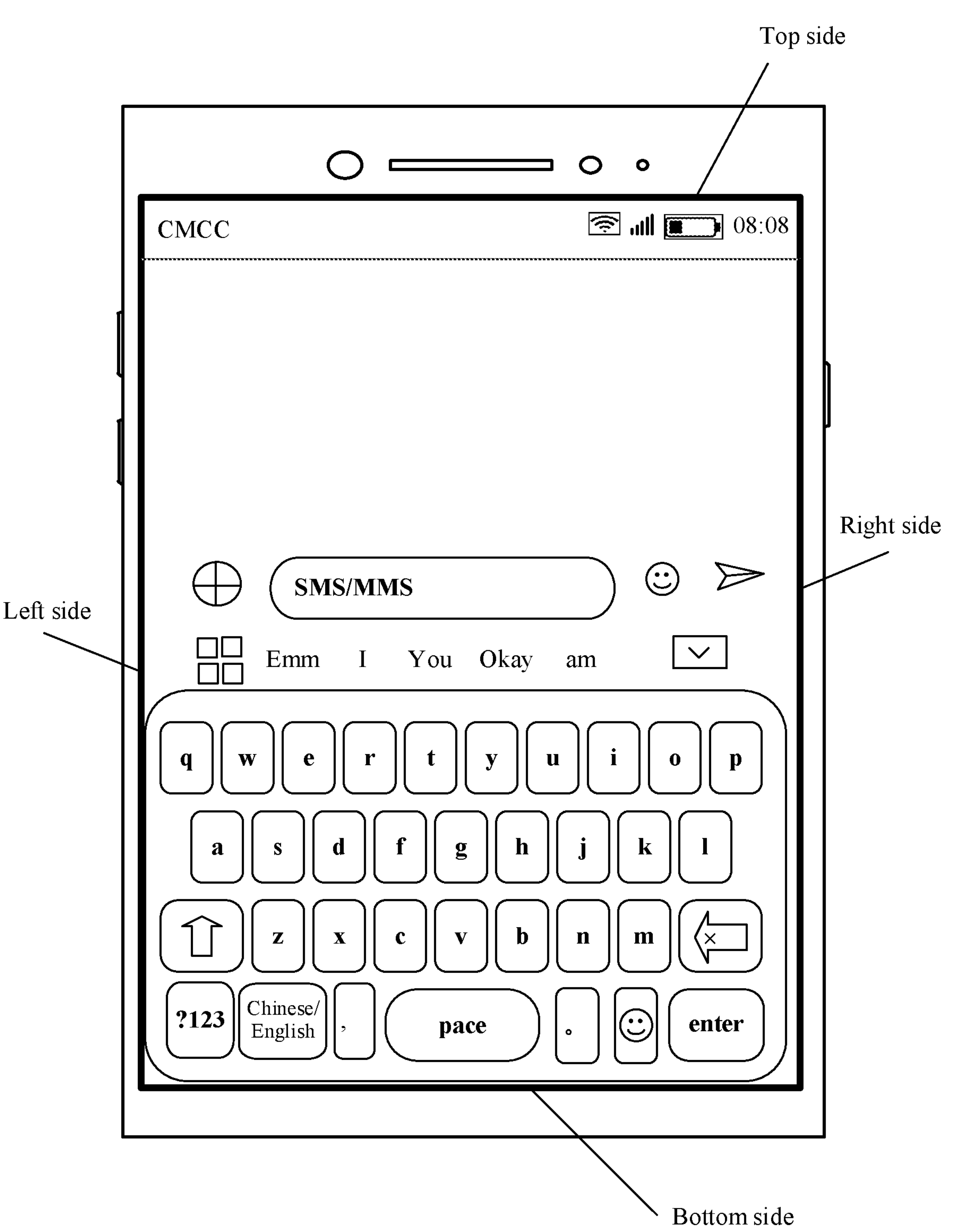
FIG. 7 is a schematic diagram of edge sides of a touchscreen according to an embodiment of this application.

It may be understood that the foregoing first side may be an edge side of the touchscreen of the mobile phone. As shown in FIG. 7, a bold black frame represents four sides of the touchscreen, which are respectively the left side, the right side, the top side, and the bottom side. The first side may be any one of the four sides. Generally, when the mobile phone is in a portrait mode, the first side may be the left side or right side. When the mobile phone is in a landscape mode, the first side may be the top side or bottom side.

In addition, in different scenarios, the mobile phone determines the first side corresponding to the first wake-up operation by using in different manners.

In a scenario, when the user performs an operation on an edge of the touchscreen, the mobile phone may determine, as the first side, the edge side of the touchscreen on which the user performs the operation.

Figure 8:
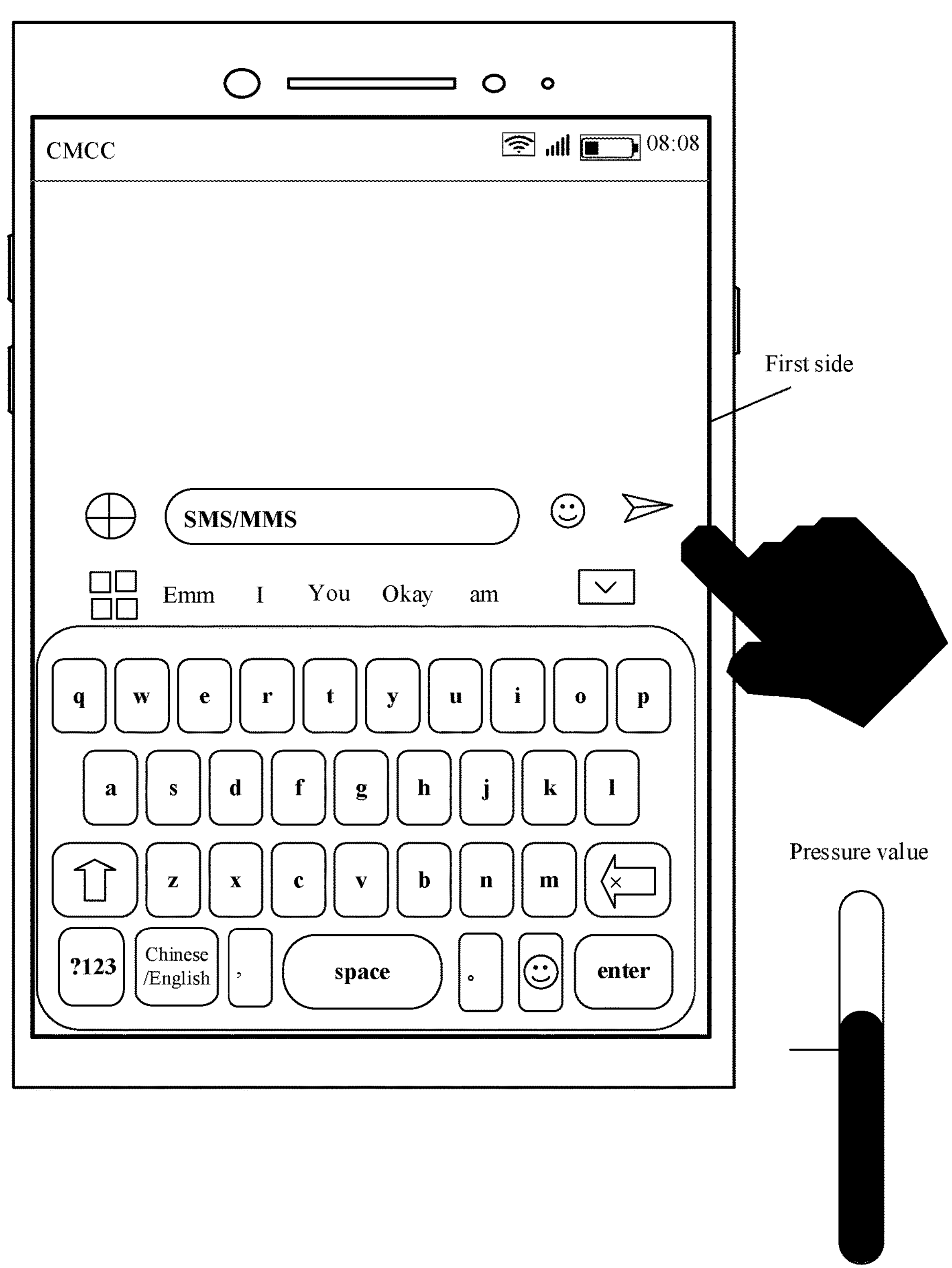
FIG. 8 is a schematic diagram 1 of a scenario in which a first side is determined according to an embodiment of this application.

For example, as shown in FIG. 8, assuming that the mobile phone is in the portrait mode, the user performs a squeeze operation on the right side edge of the touchscreen, and then, the mobile phone may determine the right side as the first side, which indicates that the user tends to perform a right-hand one-handed holding operation.

In another scenario, when the user does not perform an operation on an edge of the touchscreen, the mobile phone may trigger determining the first side based on the first wake-up operation. The first side may be determined by the mobile phone based on handedness of the user. The handedness of the user may be set by default in the mobile phone, or may be preset in the mobile phone by the user. Alternatively, the handedness of the user may be selected by the user after the mobile phone outputs prompt information when determining that the mobile phone meets the wake-up condition. Then, the handedness selected by the user may be set as default handedness.

Figure 9:
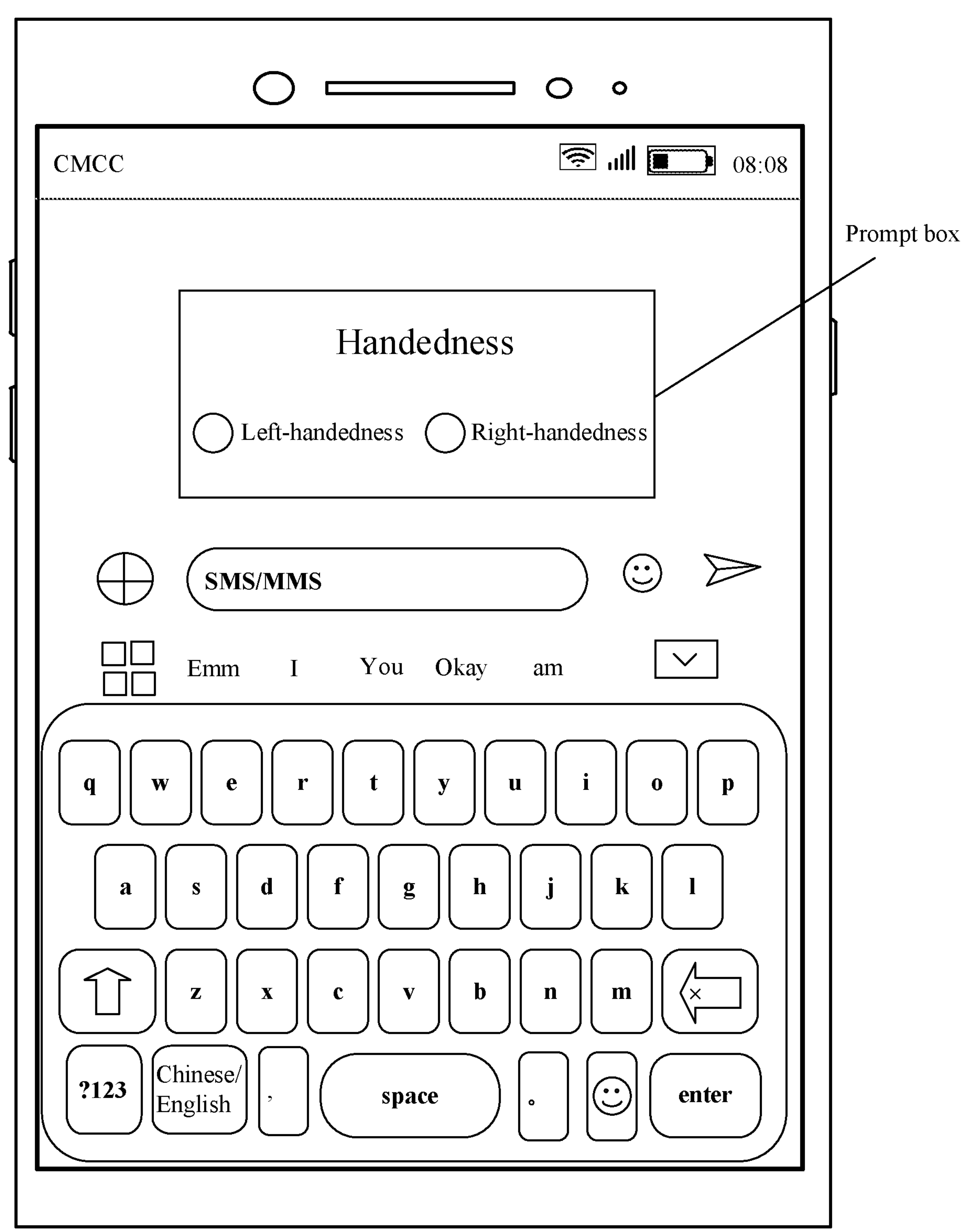
FIG. 9 is a schematic diagram 2 of a scenario in which a first side is determined according to an embodiment of this application.

For example, as shown in FIG. 9, assuming that the mobile phone is in the portrait mode, the user performs a circle drawing operation on the touchscreen. In this case, in response to the screen circle drawing operation, the mobile phone may display a prompt box in the currently displayed input interface when determining that the mobile phone meets the wake-up condition. The prompt box is used to prompt the user to select left-handedness or right-handedness. When the user selects right-handedness, the mobile phone may determine the right side as the first side based on a selection operation of the user.

In addition, in this embodiment of this application, the target input keys include the keys whose distances from the first side are greater than the preset distance in the plurality of input keys. This indicates that the target input keys are keys that are away from the first side, that is, keys that cannot be accurately touched by the user. The target input keys may be regular keys predefined in the mobile phone, or may be preset by the user. Alternatively, the target input keys may be partially regular keys, and partially set by the user.

It should be noted that, because the input keys included in the input interface have various display styles, to improve user experience, the user needs only to select the target input keys from input keys of a specific display style when the user sets the target input keys. For input keys of another display style, the mobile phone may directly use keys in a region selected by the user as target input keys, and the user does not need to select keys for each display style.

In this way, a comparison is made between a scenario in which the user manually selects the target input keys and a scenario in which the regular target input keys are regular. The target input keys manually selected by the user are more adaptive to a body structure of the user, for example, more adaptive to the figure lengths. User experience is better.

Figure 10:
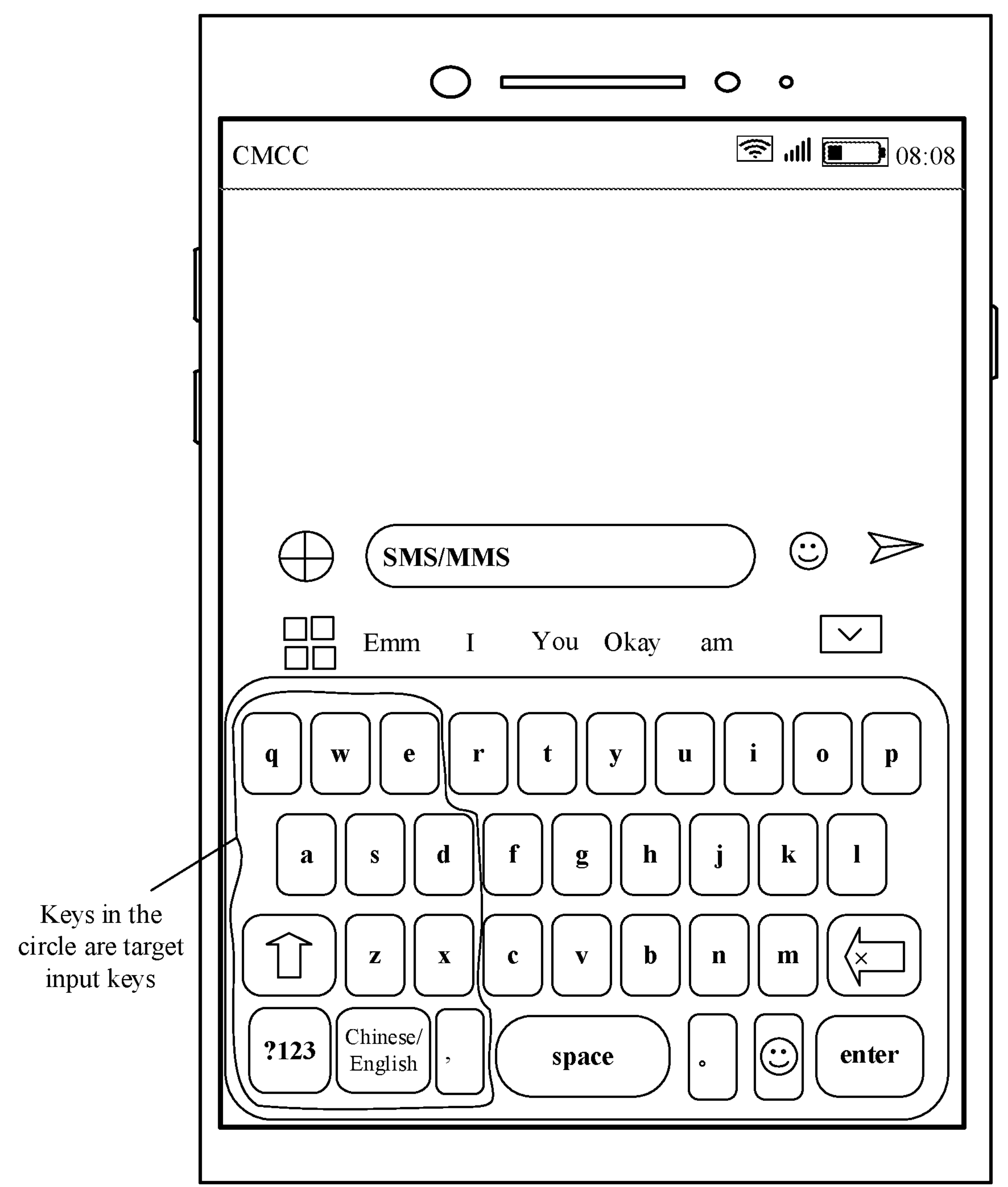
FIG. 10 is a schematic diagram of selecting target input keys by a user according to an embodiment of this application.

For example, as shown in FIG. 10, the input interface includes a plurality of input keys of a specific display style. The user may circle selected target input keys by drawing a circle. The mobile phone may use keys in the circle as the target input keys.

Optionally, in this embodiment of this application, when determining whether the mobile phone meets the wake-up condition, the mobile phone may obtain a screen display status of the mobile phone, content included in the input interface, and an on/off status of an edge display function. The screen display status may be a screen-on state or a screen-locked state. The on/off status of the edge display function is an on state or an off state, the on/off status of the edge display function is used to indicate whether the target input keys are allowed to be displayed. The on state is used to indicate that the target input keys are allowed to be displayed, and the off state is used to indicate that the target input keys are not allowed to be displayed. Generally, the on/off status of the edge display function is the on state. Certainly, the user may also manually disable the edge display function. In specific implementation, the edge display function may be enabled or disabled by controlling an edge display switch to be enabled or disabled in the settings.

In this way, when determining that the screen display status is the screen-on state, that the input interface includes a plurality of input keys and no target input key, and that the on/off status of the edge display function is the on state, the mobile phone may determine that the mobile phone meets the wake-up condition. The mobile phone may determine that the mobile phone does not meet the wake-up condition when determining that the mobile phone does not meet at least one of the following three conditions: 1. The screen display status is a screen-on state. 2. The input interface includes a plurality of input keys and no the target input keys. 3. The on/off status of the edge display function is an on state. The mobile phone may end the operation when it is impossible to determine whether the mobile phone meets the wake-up condition.

After receiving the first wake-up operation, the mobile phone determines the target input keys only when determining that the mobile phone meets the wake-up condition. In this case, determining and displaying the target input keys in makes sense. Otherwise, the mobile phone does not meet the wake-up condition, for example, the screen display status is a screen-locked state. In this case, the input interface cannot be displayed, and determining the target input keys does not make sense.

303. The mobile phone displays the target input keys at an associated position of the first side in the input interface.

After determining the target input keys in the input interface currently displayed, the mobile phone may display the target input keys at the associated position of the first side in the input interface. The associated position is a preset region of the touchscreen, and the preset region corresponds to the first side. In addition, a display style of the target input keys is the same as the display style of the plurality of input keys.

Optionally, in this embodiment of this application, the mobile phone may display the target input keys in a floating input box at the associated position of the first side in the input interface.

It may be understood that a display type of the foregoing floating input box may be at least one of the following: single-column display, multi-column display, arc-shaped display, hollow circle display, semi-circle display, and quarter circle display.

Figure 11A:
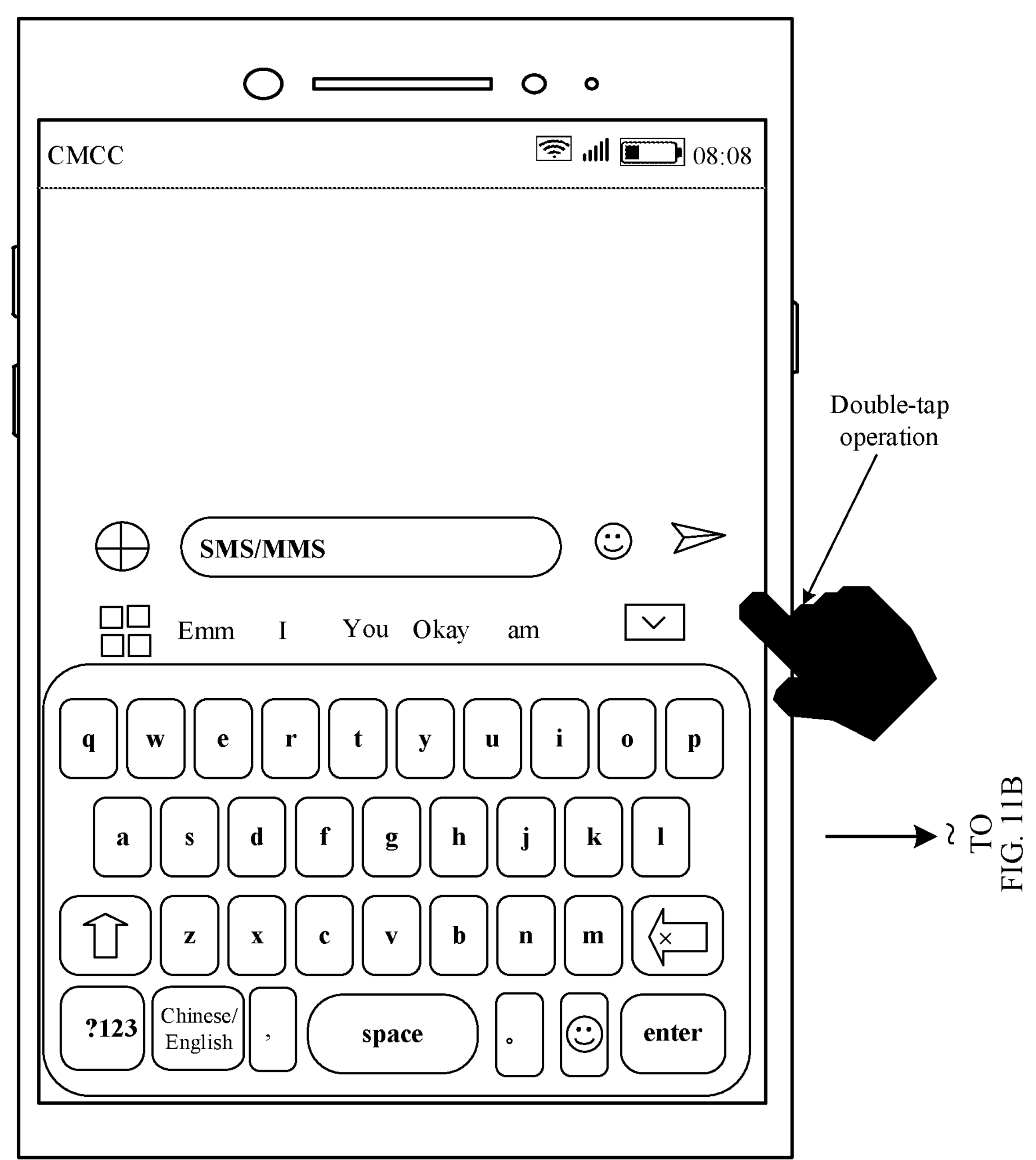
FIG. 11A and FIG. 11B are a schematic diagram of a scenario in which target input keys are displayed according to an embodiment of this application.
Figure 11B:
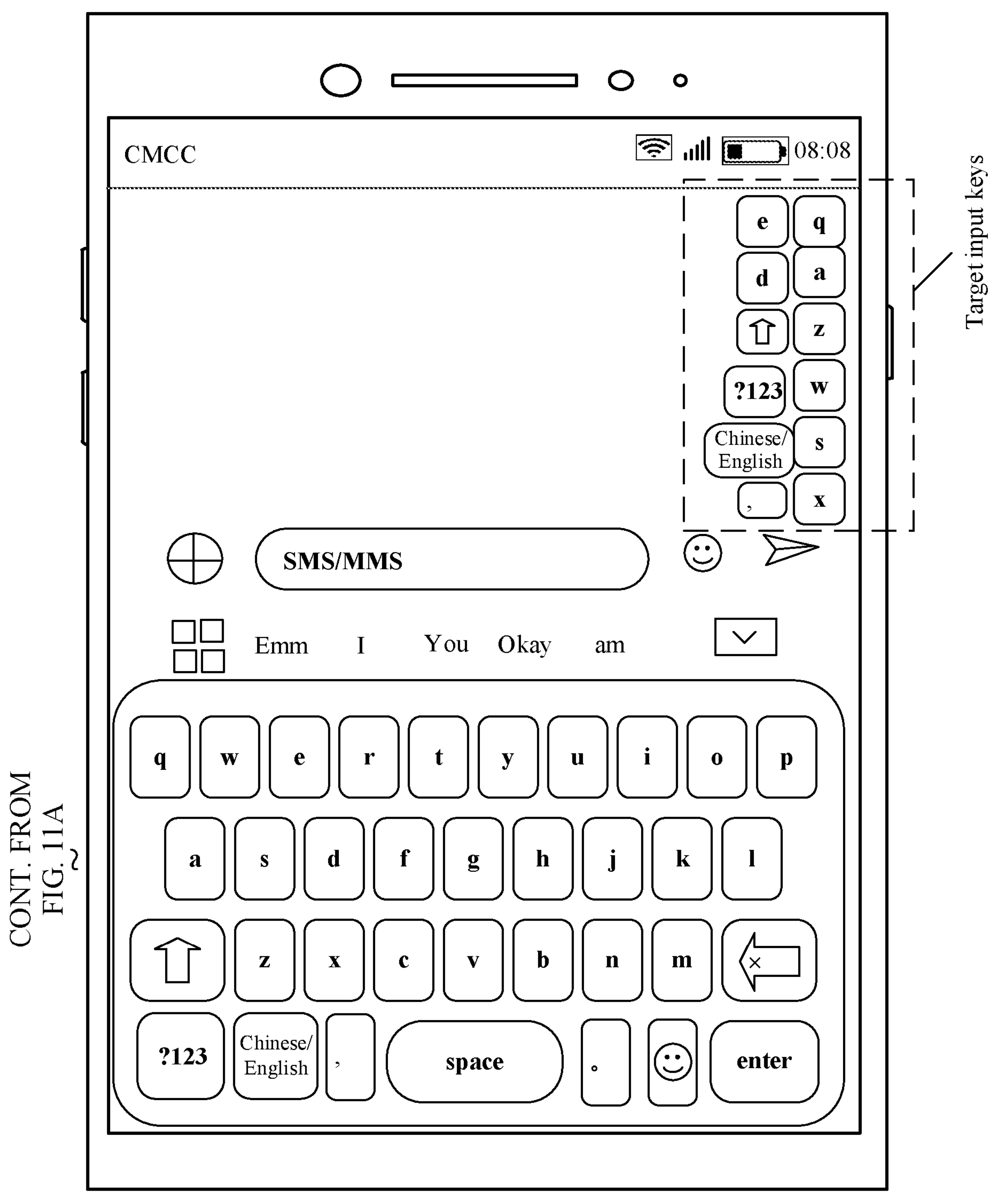

For example, as shown in FIG. 11A, assuming that the wake-up gesture is a double-tap gesture on the right side of the screen, when the user performs a double-tap operation on the right side of the touchscreen, the mobile phone may receive the first wake-up operation. If the mobile phone determines, in response to the first wake-up operation, that the mobile phone meets the wake-up condition, the mobile phone may determine the target input keys in the input interface. Assuming that the target input keys are the left three columns of keys in the plurality of input keys of the current display style, and assuming that the display type of the floating input box is two-column display, as shown in FIG. 11B, the mobile phone displays the target input keys in the floating input box at an associated position on the right side of the input interface.

It should be noted that, in this embodiment of this application, the mobile phone not only supports displaying the target input keys at the associated position on the first side in the input interface, but also supports a Chinese/English character input by the user. A predictive Chinese/English character, digit, symbol, and the like based on the user input are displayed at the associated position on the first side.

According to the input interface display method provided in this embodiment of this application, a terminal receives a first wake-up operation, and determines target input keys in a currently displayed input interface in response to the first wake-up operation when determining that the terminal meets a wake-up condition, and displays the target input keys at an associated position of a first side of the input interface. The first side corresponds to the first wake-up operation, and is a side that is closer to a hand of the user. The target input keys are keys that are in the input interface and that are away from the first side, that is, keys that cannot be accurately touched by the user during a one-handed operation. When receiving the first wake-up operation and determining that the terminal meets the wake-up condition, the terminal may obtain and display the target input keys. Because the user needs only to perform the first wake-up operation to switch the terminal to the one-handed input mode, the operation of the user is simplified and user experience is improved, compared with complex setting operations in a conventional technology.

Figure 12:
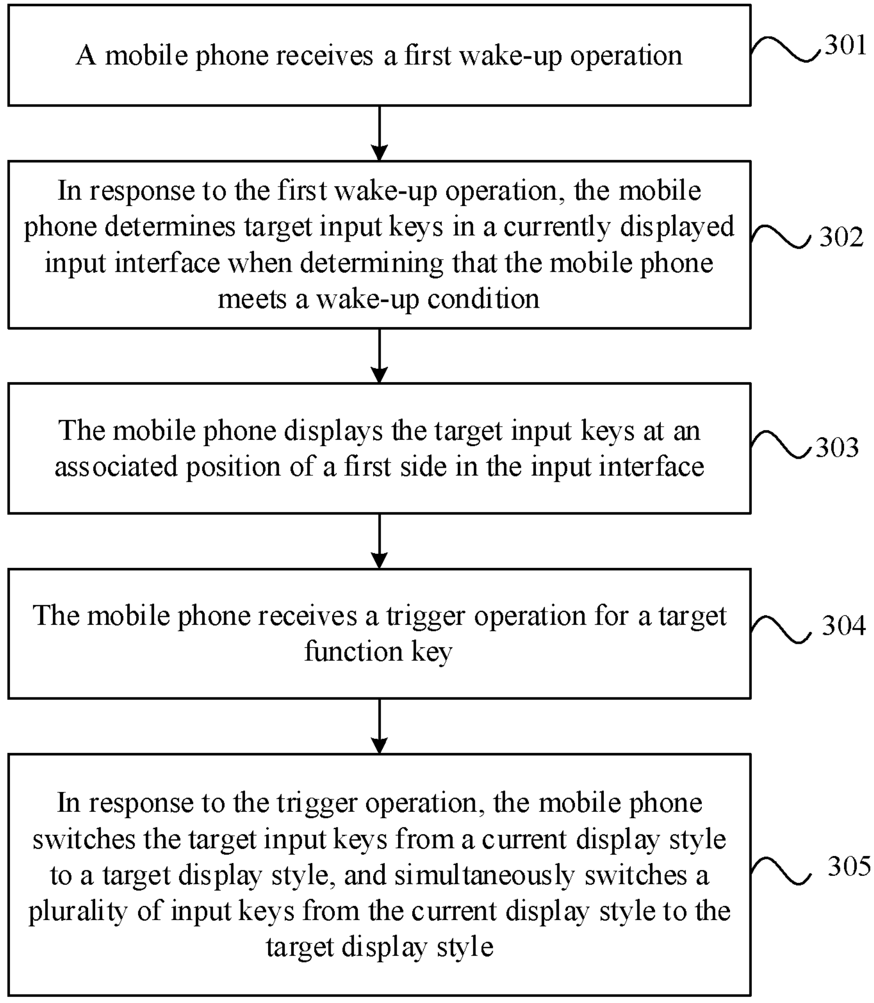
FIG. 12 is a schematic flowchart 2 of an input interface display method according to an embodiment of this application.

In a scenario, after the mobile phone displays the target input keys in the input interface, if the target input keys include a function key, the mobile phone may implement synchronous switching between a display style of the plurality of input keys and a display style of the target input keys. The function key refers to another input key in the input interface other than standard-defined keys. The standard-defined keys refer to input keys such as symbols, letters, or digits. Specifically, based on FIG. 3, as shown in FIG. 12, after step 303 is performed, the input interface display method provided in this embodiment of this application may further include the following step 304 and step 305.

304. The mobile phone receives a trigger operation for a target function key.

The target function key may be any function key in the target input keys. Alternatively, the target function key may be any function key in the plurality of input keys.

For example, the target function key may be an input key for indicating uppercase and lowercase switching, or may be an input key for indicating digit switching, or may be an input key for indicating symbol switching, or may be an input key for indicating letter switching.

305. In response to the trigger operation, the mobile phone switches the target input keys from a current display style to a target display style, and simultaneously switches the plurality of input keys from the current display style to the target display style.

Figure 13A:
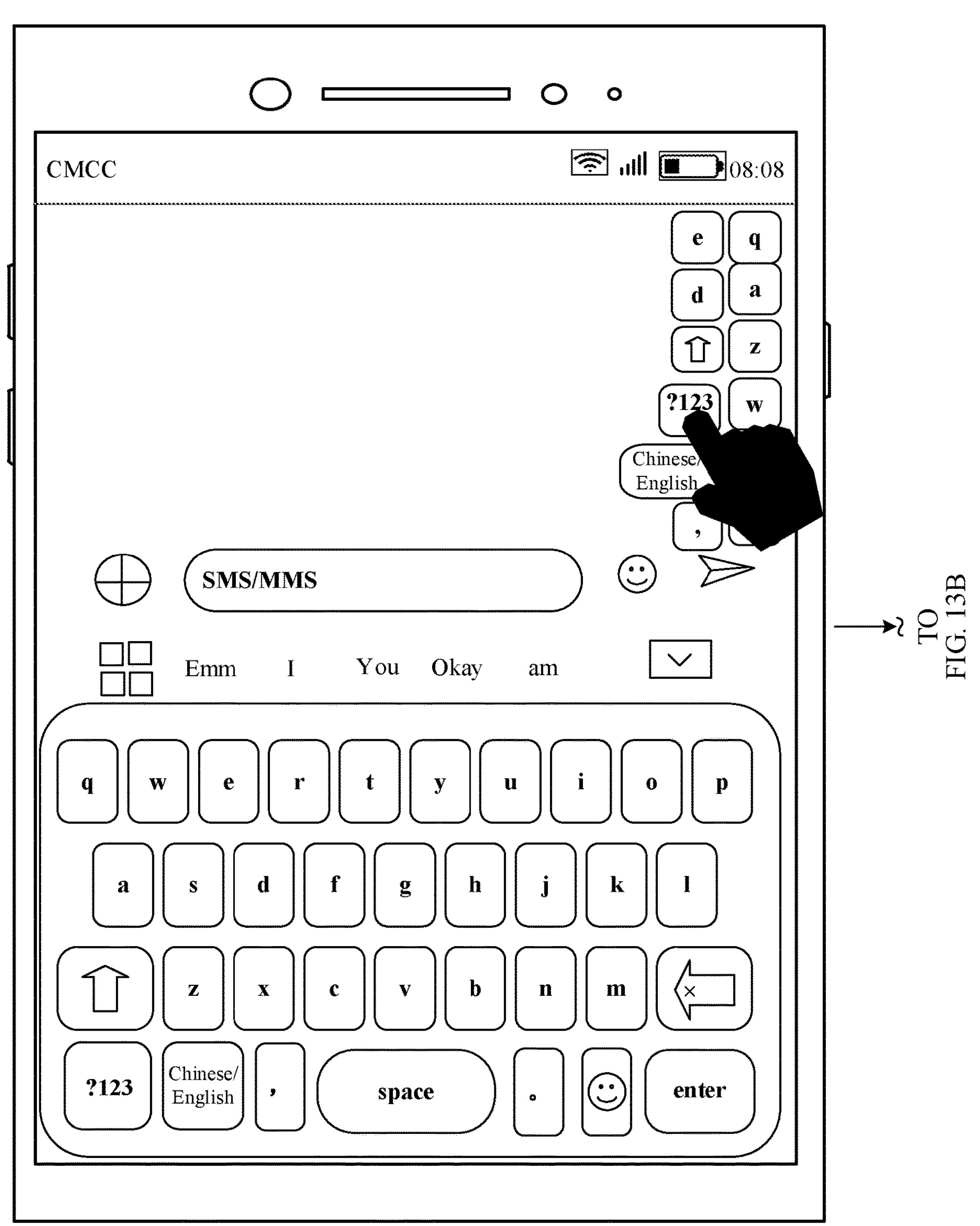
FIG. 13A to FIG. 13C are a schematic diagram of a display style switching scenario according to an embodiment of this application.
Figure 13B:
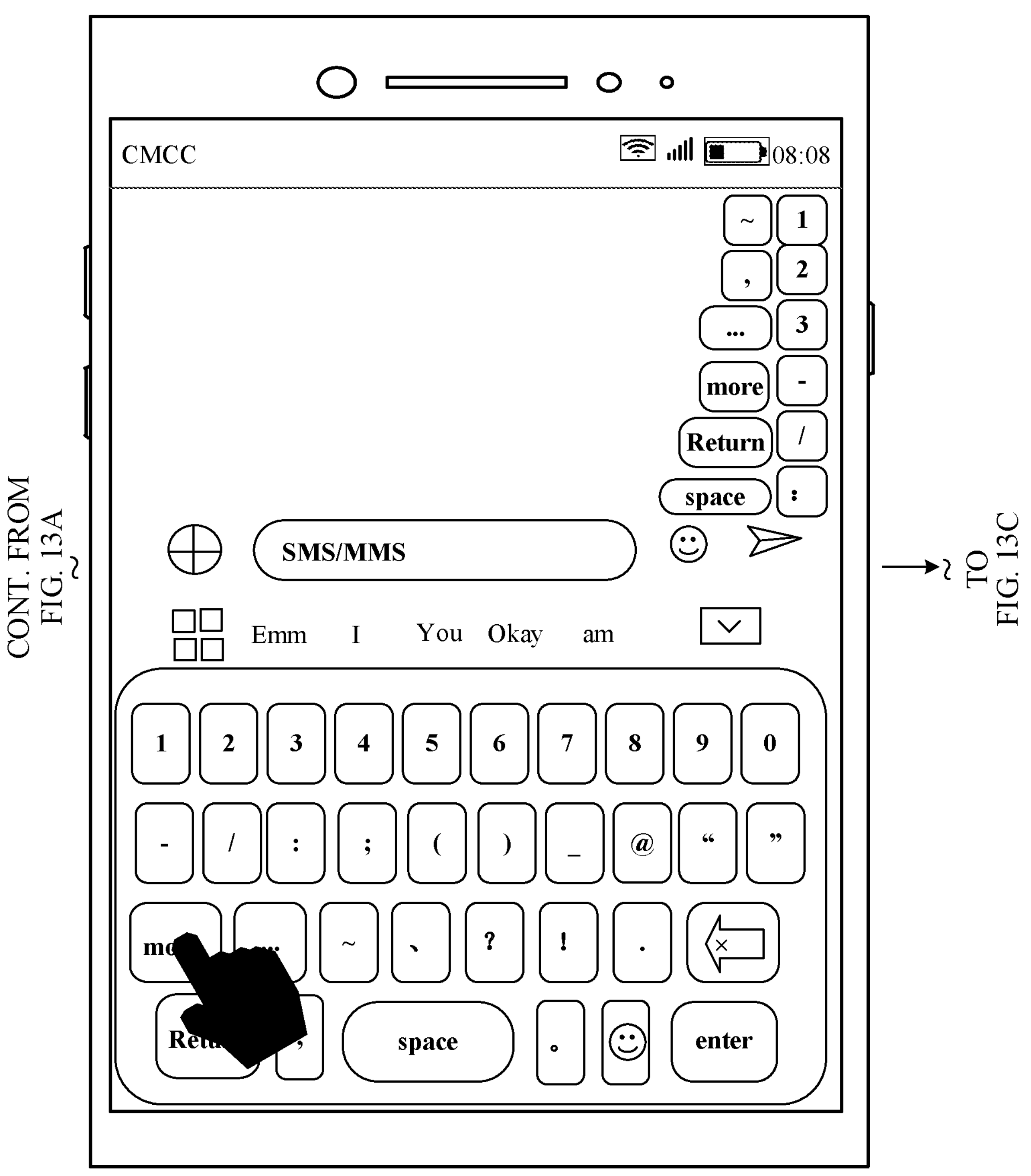
Figure 13C:
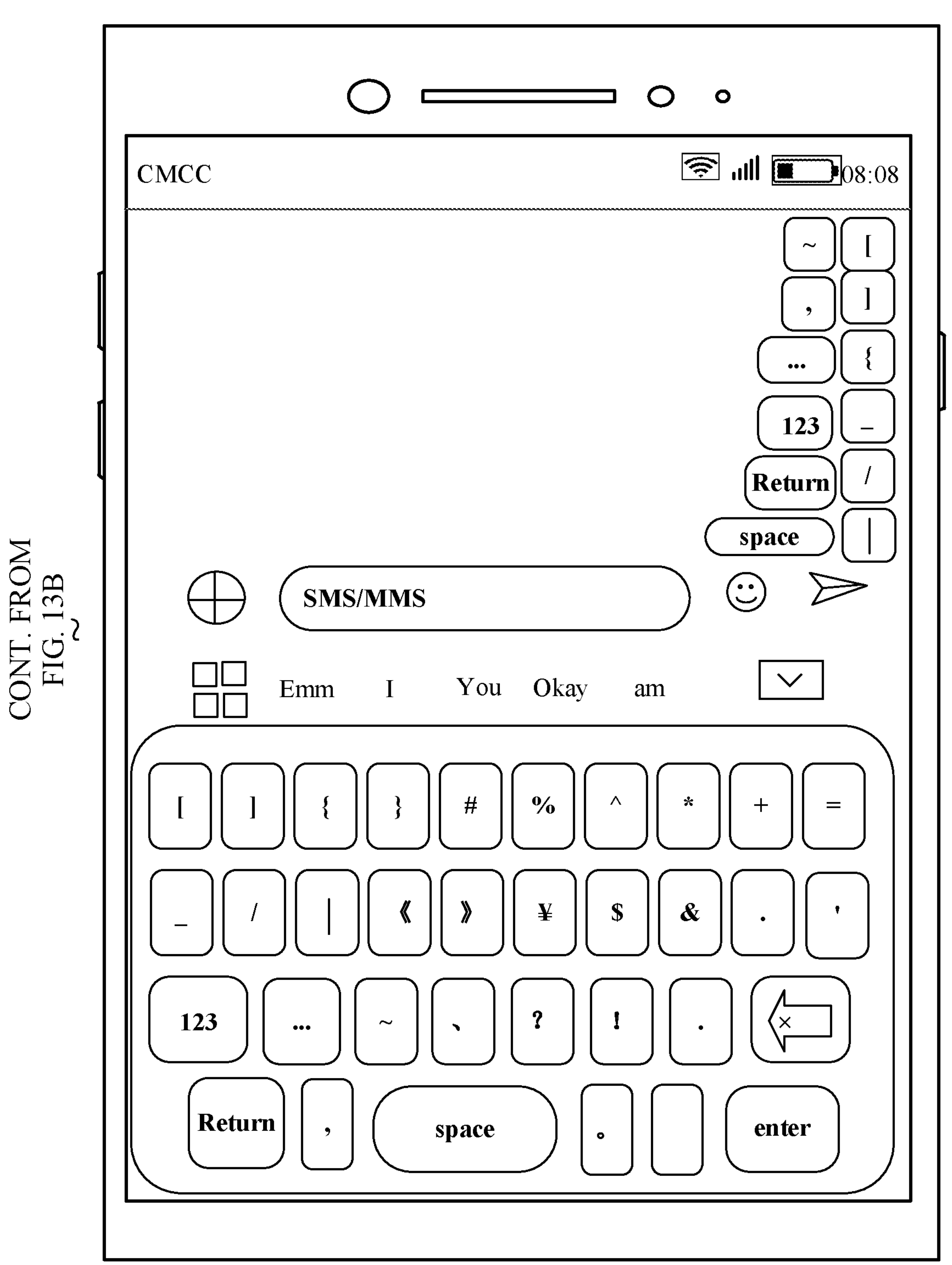

For example, based on FIG. 11B, the mobile phone displays the target input keys in a floating input box at an associated position on the right side of the input interface. In the input interface, the current display style of the target input key and the current display style of the keys in an input keyboard are both a letter key style. As shown in FIG. 13A, when the user performs a trigger operation on an input key that is in the target input keys and that is used for indicating the digit switching, the mobile phone may switch, in response to the trigger operation, the target input keys and the keys in the input keyboard from the letter key style to a digit key style. FIG. 13B shows an input interface after switching to the digit key style. When the user performs a trigger operation on an input key that is in an input keyboard and that is used for indicating the symbol switching, the mobile phone may switch, in response to the trigger operation, the target input keys and keys in the input keyboard from the digit key style to a symbol key style. FIG. 13C shows an input interface after switching to the symbol key style. In this way, synchronous switching between display styles of the target input keys and the plurality of input keys is implemented.

The display style of the target input keys is switched synchronously with that of the plurality of input keys to ensure that the display style of the target input keys is consistent with that of the plurality of input keys. Compared with separate display style switching, the user operation is simple and user experience is better.

Figure 14:
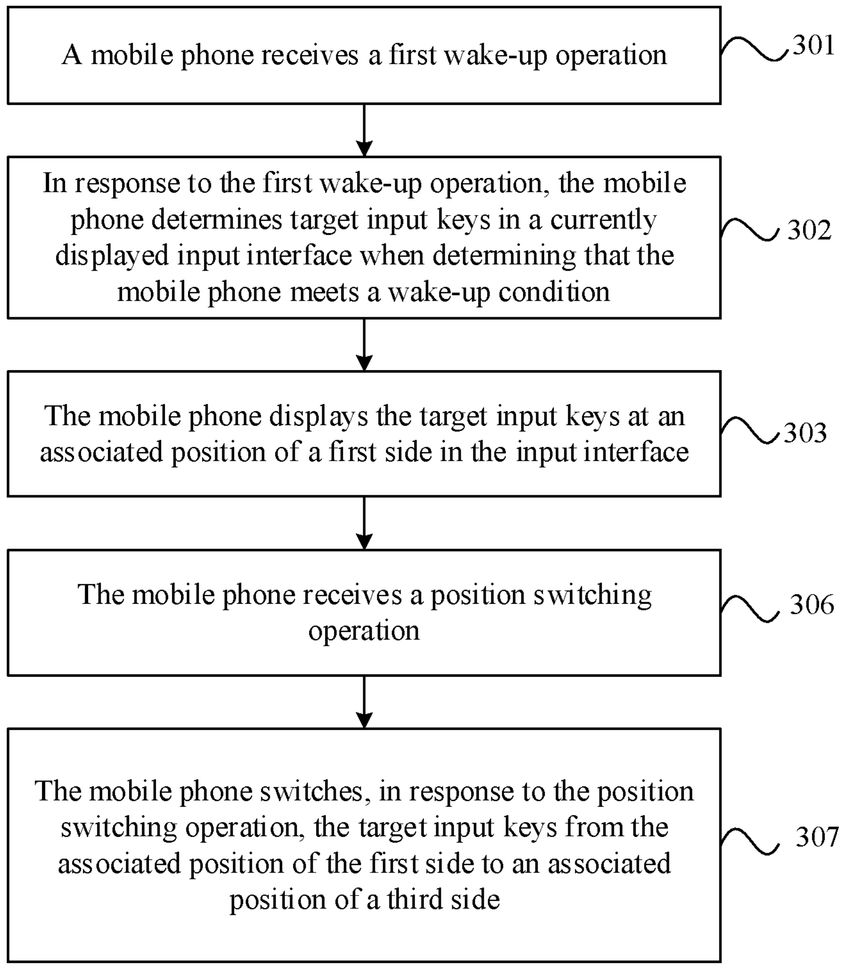
FIG. 14 is a schematic flowchart 3 of an input interface display method according to an embodiment of this application.

In a scenario, after the mobile phone displays the target input keys in the input interface, the mobile phone may switch a display position of the target input keys based on an actual situation, for example, the user changes from holding the mobile phone with the left hand to holding the mobile phone with the right hand. Specifically, based on FIG. 3, as shown in FIG. 14, after step 303 is performed, the input interface display method provided in this embodiment of this application may further include the following step 306 and step 307.

306. The mobile phone receives a position switching operation.

The mobile phone may determine, when determining that a gesture used by the user to perform the touch operation on the touchscreen is a position switching gesture, that the position switching operation is received. The position switching gesture may be preset in the mobile phone.

307. The mobile phone switches, in response to the position switching operation, the target input keys from the associated position of the first side to an associated position of a third side.

The third side is another edge side of the touchscreen of the mobile phone other than the first side.

After receiving the position switching operation, the mobile phone may first obtain the third side corresponding to the position switching operation, and then switch the target input keys from the associated position of the first side to the associated position of the third side.

Figure 15A:
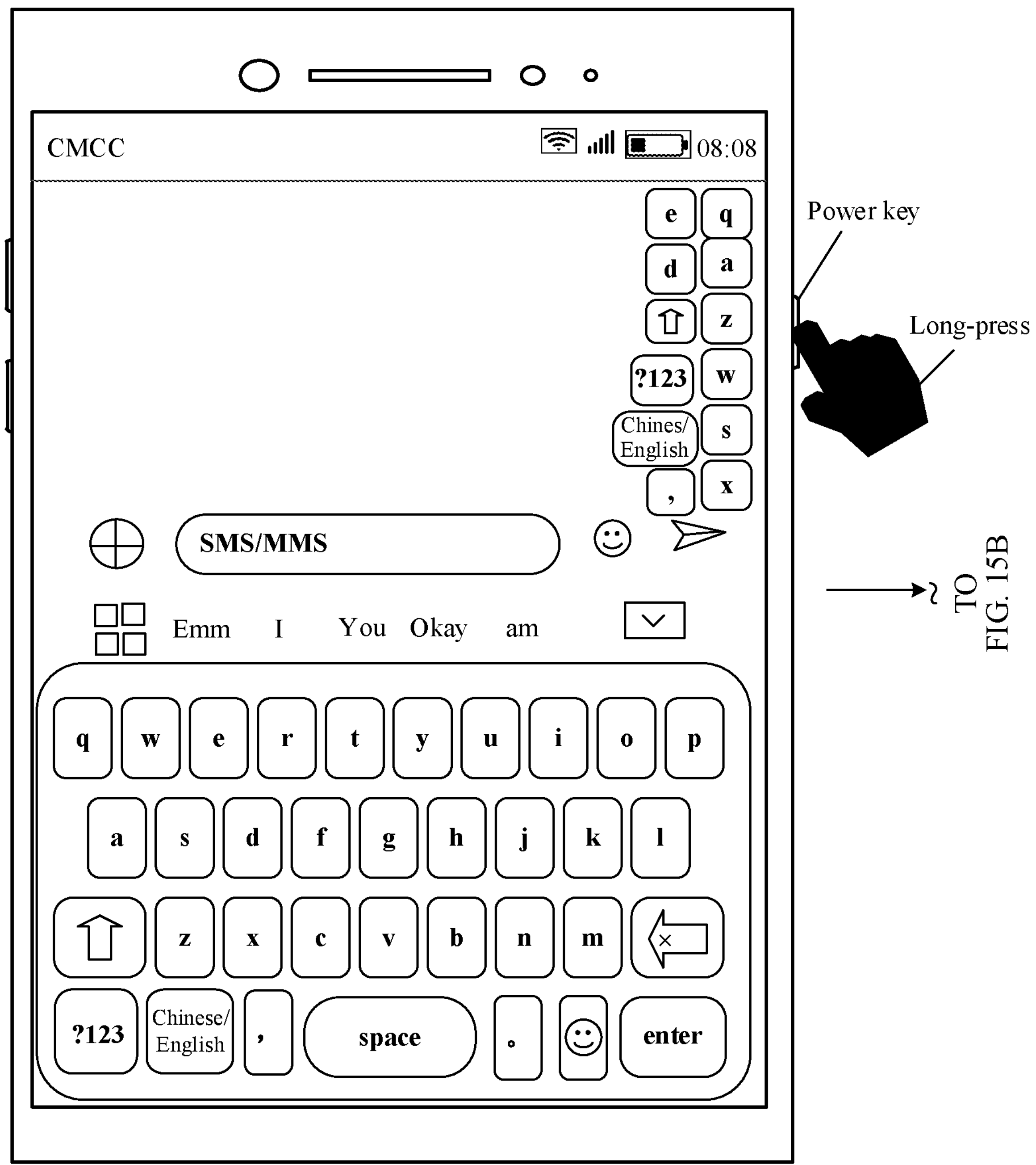
FIG. 15A and FIG. 15B are a schematic diagram of a scenario in which a display position of target input keys is switched according to an embodiment of this application.
Figure 15B:
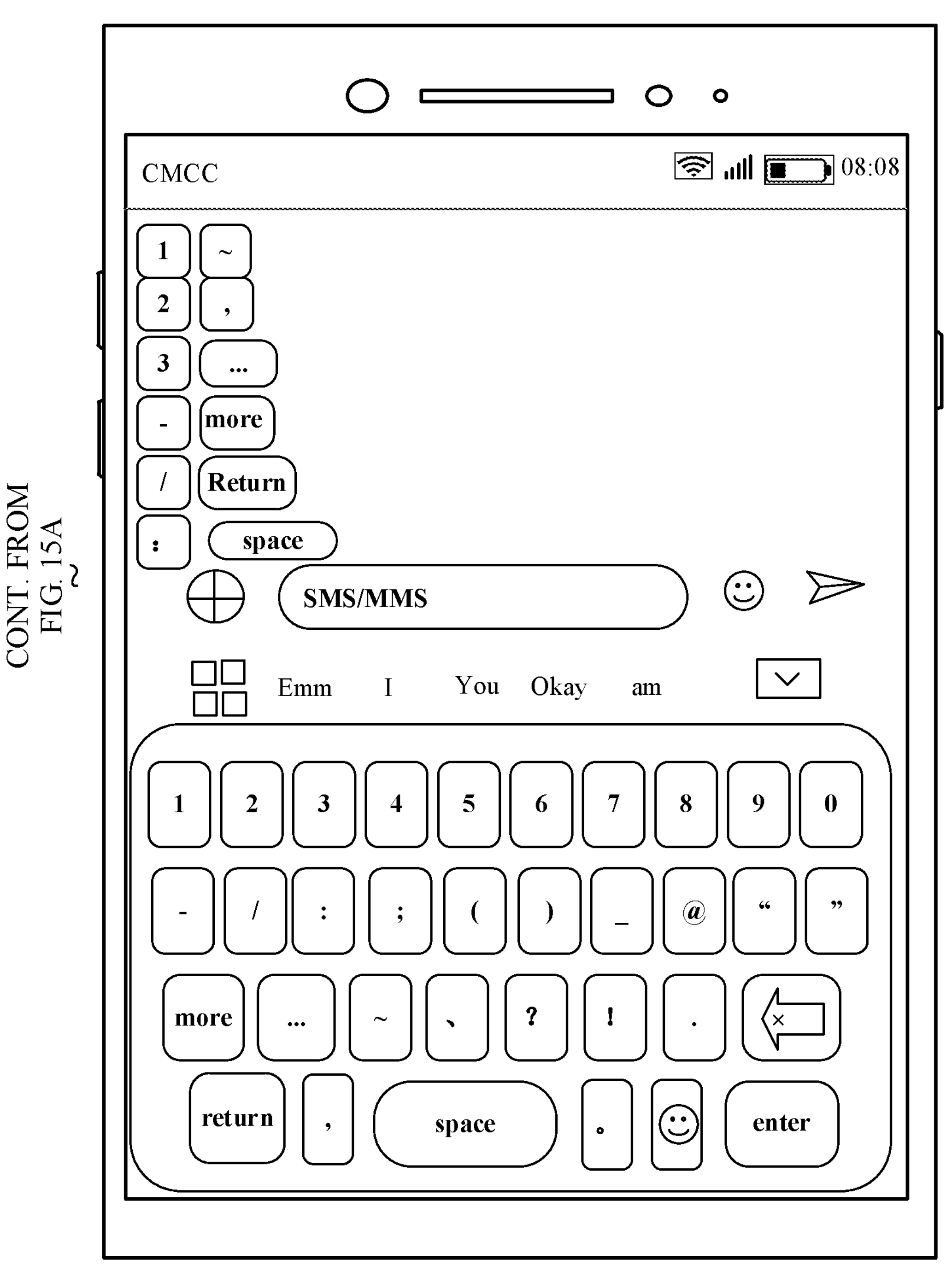

For example, based on FIG. 11B, the mobile phone displays the target input keys in a floating input box at an associated position on the right side of the input interface. As shown in FIG. 15A, assuming that the position switching gesture is a touch and hold operation performed by the user on the power key, when the user performs the touch and hold operation on the power key, the mobile phone may receive the position switching operation, and obtain the third side corresponding to the position switching operation. Assuming that the third side is the left side of the touchscreen of the mobile phone, the mobile phone may switch the target input keys from the associated position on the right side to an associated position on the left side. As shown in FIG. 15B, after the switching, the mobile phone displays the target input keys in the floating input box at the associated position on the left side of the input interface.

In this way, the mobile phone switches the display position of the target input keys based on an actual situation, so that the target input keys are displayed at a position that can be accurately touched by the user to facilitate an input operation of the user. User experience is better.

Figure 16:
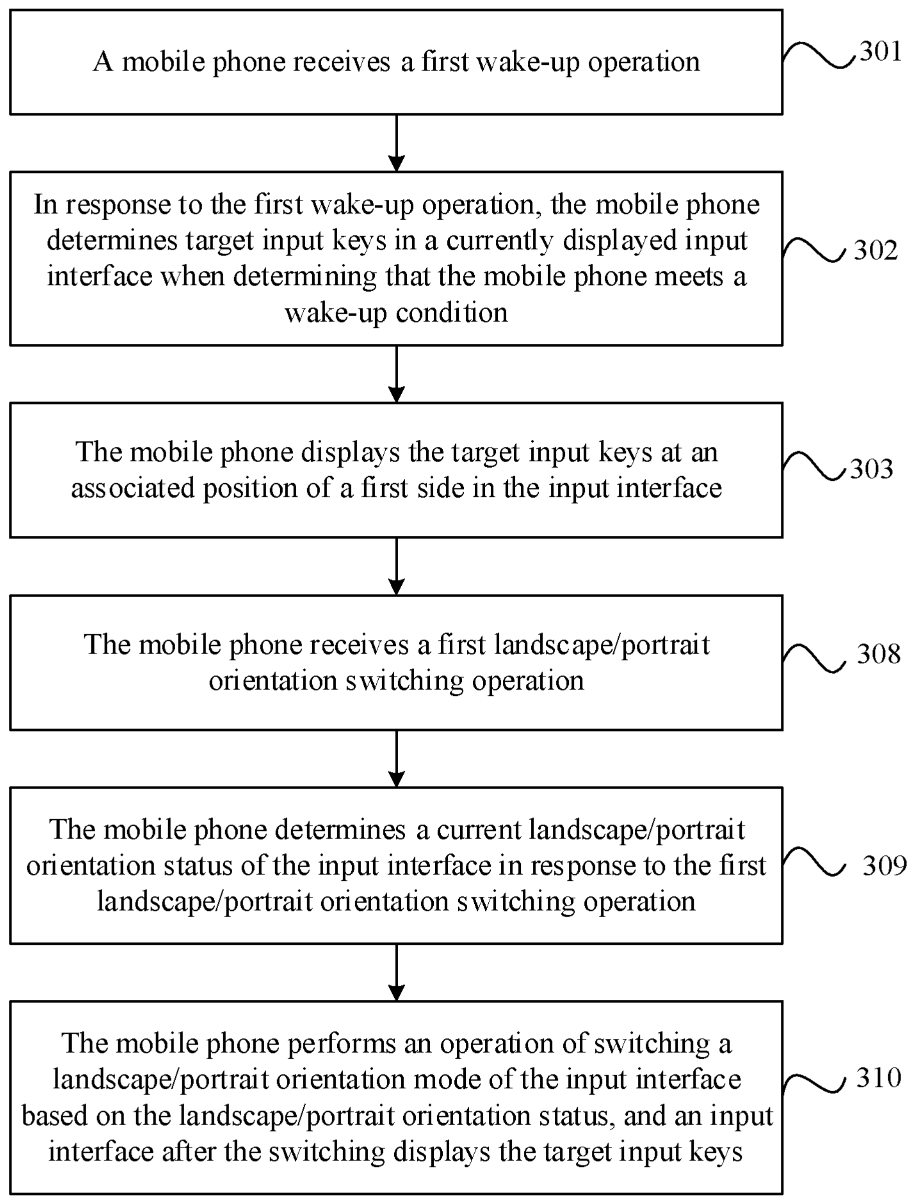
FIG. 16 is a schematic flowchart 4 of an input interface display method according to an embodiment of this application.
Figure 17:
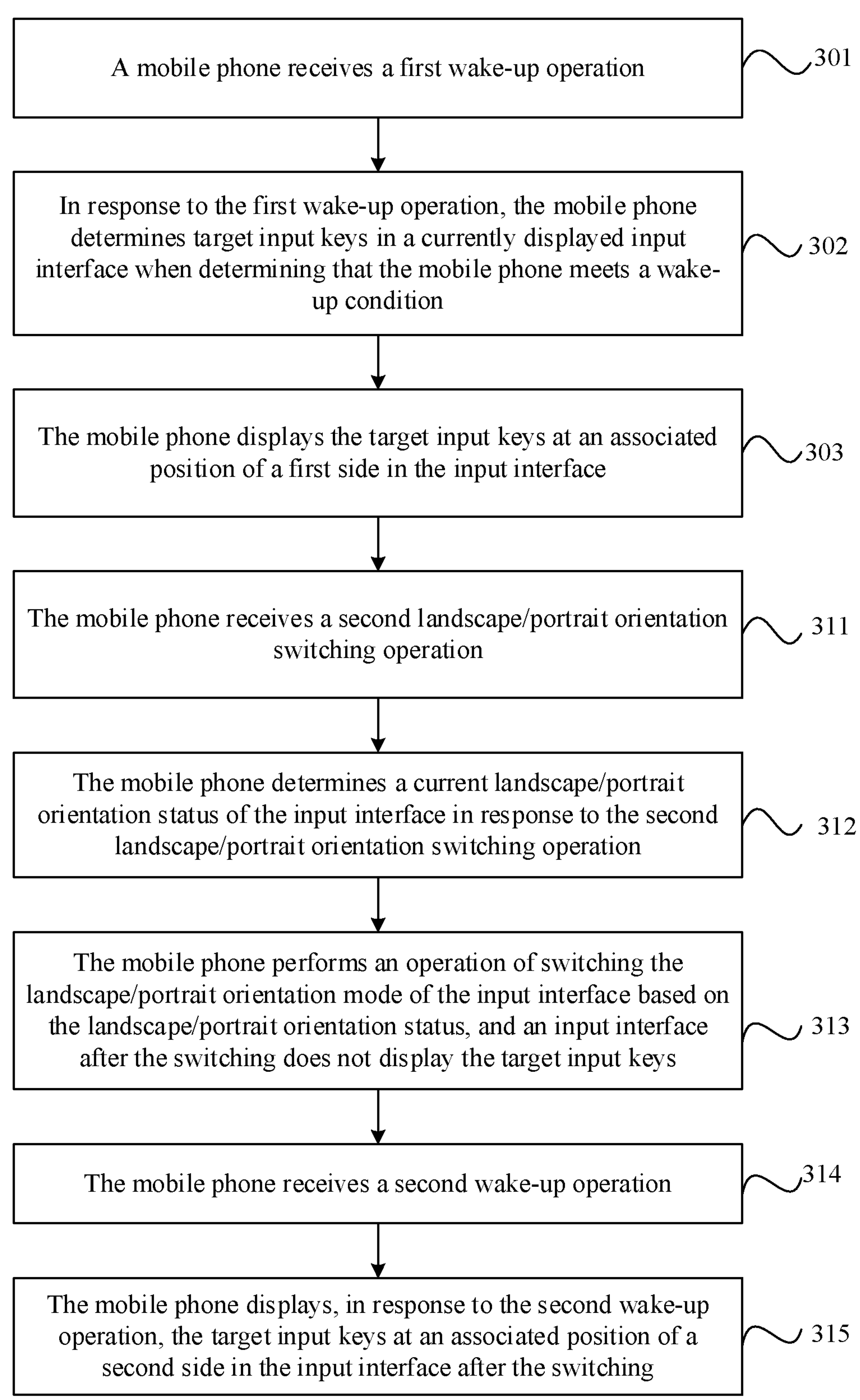
FIG. 17 is a schematic flowchart 5 of an input interface display method according to an embodiment of this application.

In a scenario, after the mobile phone displays the target input keys in the input interface, the user may perform the landscape/portrait orientation switching operation in the input interface. In this scenario, the mobile phone may determine, based on different landscape/portrait orientation switching operations, whether the user keeps the one-handed input mode or switches to a two-handed input mode in the input interface after the switching. In addition, the mobile phone may determine, based on a determining result, whether to display the target input keys in the input interface after the switching. Specifically, based on FIG. 3, after step 303 is performed, if the user wants to keep the one-handed input mode after switching the landscape/portrait orientation, as shown in FIG. 16, the input interface display method provided in this embodiment of this application may further include the following step 308 to step 310. If the user wants to switch to the two-handed input mode after switching the landscape/portrait orientation, as shown in FIG. 17, the input interface display method provided in this embodiment of this application may further include the following step 311 to step 315.

As shown in FIG. 16, the input interface display method provided in this embodiment of this application may further include the following step 308 to step 310.

308. The mobile phone receives a first landscape/portrait orientation switching operation.

The mobile phone may determine, when determining that a gesture used by the user to perform the touch operation on the touchscreen is a first landscape/portrait orientation switching gesture, that the first landscape/portrait orientation switching operation is received. The first landscape/portrait orientation switching gesture may be preset in the mobile phone. The first landscape/portrait orientation switching operation corresponds to the one-handed input mode, which indicates that the user wants to continue to maintain the one-handed input mode after the landscape/portrait orientation switching.

309. The mobile phone determines a current landscape/portrait orientation status of the input interface in response to the first landscape/portrait orientation switching operation.

The landscape/portrait orientation status may be a landscape orientation state or a portrait orientation state, and the target input keys are displayed in the input interface.

310. The mobile phone performs an operation of switching a landscape/portrait orientation mode of the input interface based on the landscape/portrait orientation status, and an input interface after the switching displays the target input keys.

After determining the current landscape/portrait orientation status of the input interface, the mobile phone may perform the operation of switching the landscape/portrait orientation mode of the input interface. Specifically, if the landscape/portrait orientation status is the portrait orientation state, the mobile phone switches the input interface from the portrait orientation state to the landscape orientation state. If the landscape/portrait orientation status is a landscape orientation state, the mobile phone switches the input interface from the landscape orientation state to the portrait orientation state.

It may be understood that, after switching the landscape/portrait orientation mode of the input interface, the mobile phone may display the target input keys at the associated position of the second side in the input interface after the switching. A position of the second side relative to the input interface after the switching is the same as a position of the first side relative to the input interface before the switching. For example, when the mobile phone switches the input interface from the portrait orientation state to the landscape orientation state, assuming that the first side is the right side, the second side is the right side of the input interface in the landscape orientation state, in this case, the second side is the top side or the bottom side in the portrait orientation state.

In addition, in a scenario, after landscape/portrait orientation switching is performed in the input interface, some content in the input interface is stretched and displayed, and some content is compressed and displayed. For example, when the input interface is switched from the portrait orientation state to the landscape orientation state, the longitudinal content of the input interface is compressed and displayed, and the transverse content of the input interface, for example, the plurality of input keys, is stretched and displayed. Therefore, fewer input keys may be accurately touched by the user with one hand, and it is more difficult to operate with one hand. Therefore, when the mobile phone displays the target input keys in the floating input box in the input interface, a display type of the floating input box before the switching is different from that of the floating input box after the switching. For example, when the mobile phone switches the input interface from the portrait mode to the landscape mode, a display type of the floating input box before the switching is the two-column display. A display type of the floating input box after the switching may be the four-column display. In addition, a quantity of the target input keys after the switching may be greater than or equal to that of the target input keys before the switching.

Figure 18A:
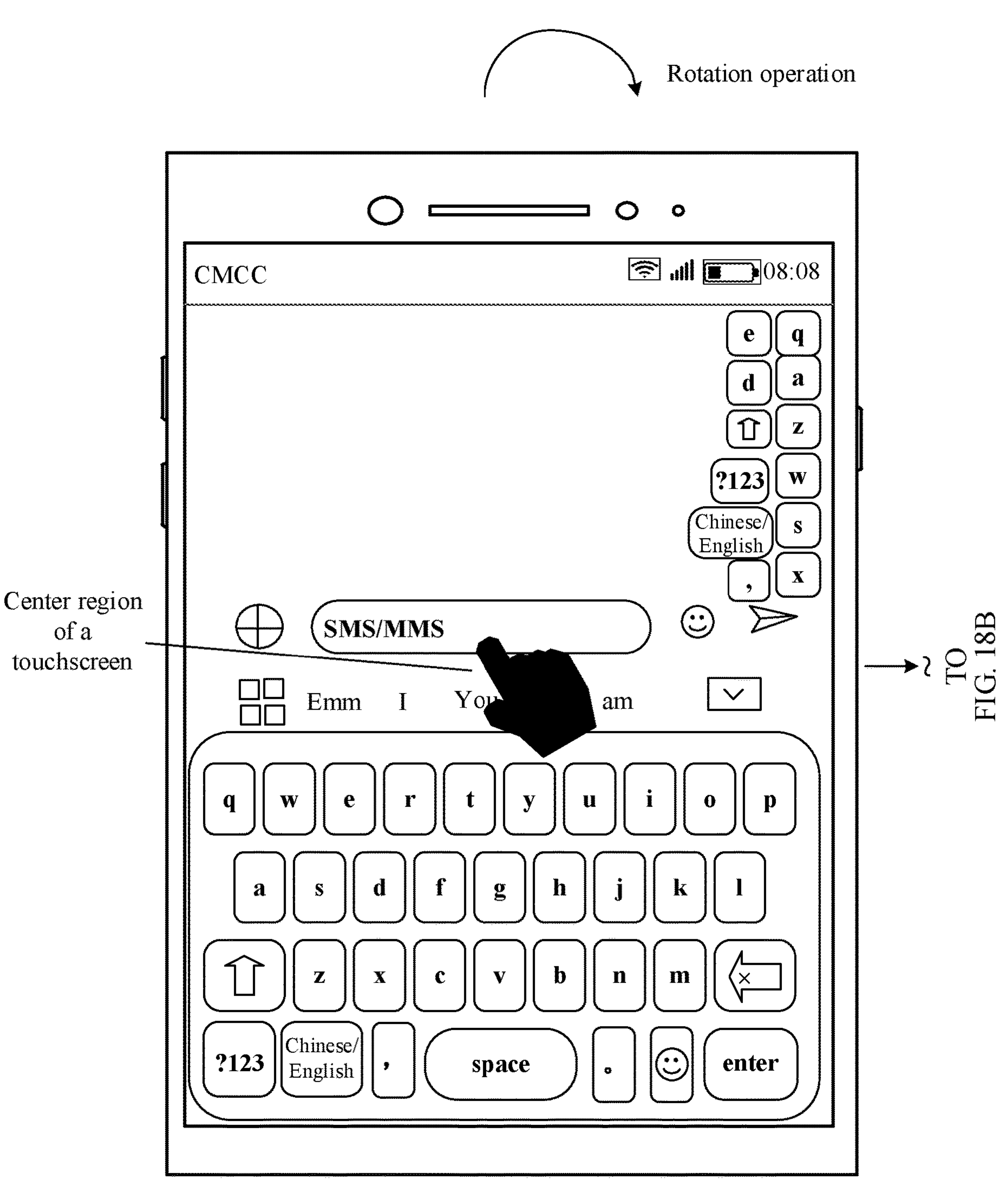
FIG. 18A and FIG. 18B are a schematic diagram 1 of a landscape/portrait orientation switching scenario according to an embodiment of this application.
Figure 18B:
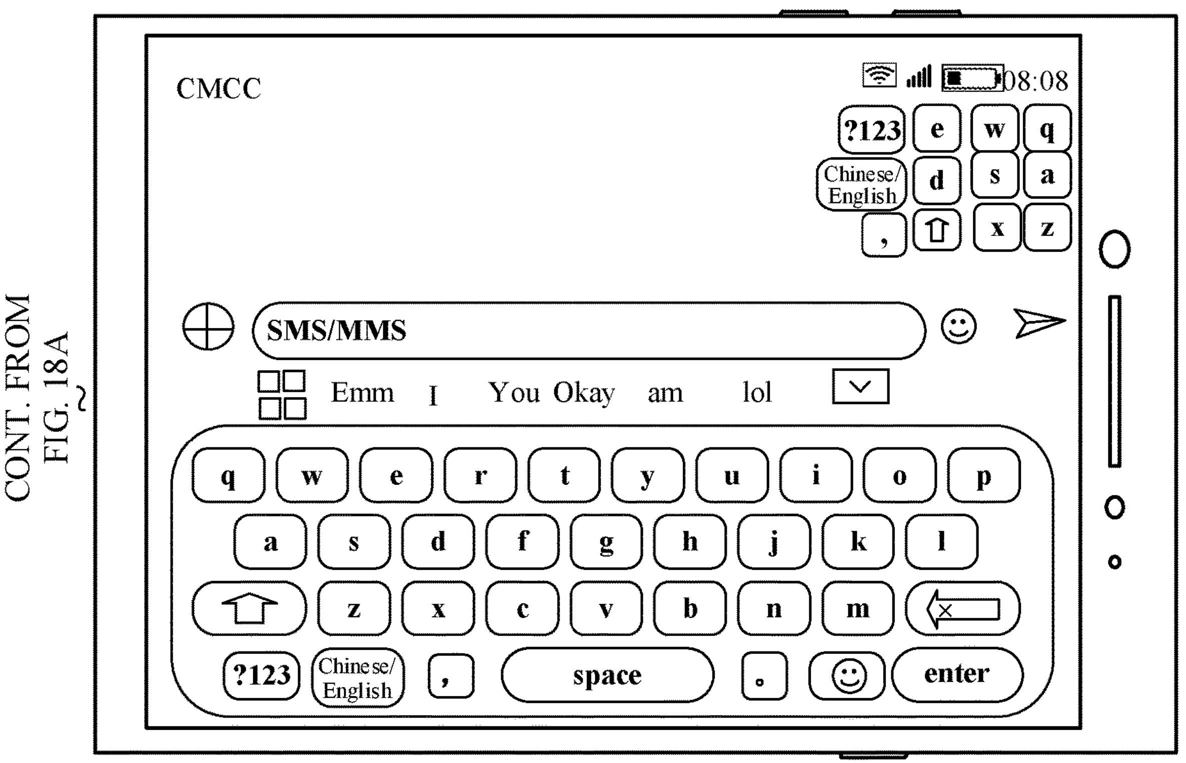

For example, based on FIG. 11B, the mobile phone displays the target input keys in the floating input box at the associated position of the right side of the input interface. The input interface is in the portrait orientation state, and the display type of the floating input box is the two-column display. As shown in FIG. 18A, assuming that the first landscape/portrait orientation switching gesture is a rotation gesture, when the user grabs the central region of the touchscreen with fingers to rotate, and holds still after the rotation operation, the mobile phone determines that the first landscape/portrait orientation switching operation is received. The mobile phone switches the input interface from the portrait orientation state to the landscape orientation state in response to the first landscape/portrait orientation switching operation. Assuming that a quantity of the target input keys after the switching is the same as that of the target input keys before the switching and a display type of the floating input box after the switching is four-column display, as shown by FIG. 18B, the mobile phone displays the target input keys in the floating input box at the associated position of the right side in the input interface in the landscape orientation state.

As shown in FIG. 17, the input interface display method provided in this embodiment of this application may further include the following step 311 to step 315.

311. The mobile phone receives a second landscape/portrait orientation switching operation.

When determining that a gesture used by the user to perform the touch operation on the touchscreen is a second landscape/portrait orientation switching gesture, the mobile phone may determine that the second landscape/portrait orientation switching operation is received. The second landscape/portrait orientation switching gesture may be preset in the mobile phone. The second landscape/portrait orientation switching operation corresponds to the two-handed input mode, which indicates that the user wants to switch to the two-handed input mode after switching the landscape/portrait orientation.

312. The mobile phone determines a current landscape/portrait orientation status of the input interface in response to the second landscape/portrait orientation switching operation.

The landscape/portrait orientation status may be a landscape orientation state or a portrait orientation state, and the target input keys are displayed in the input interface.

313. The mobile phone performs an operation of switching the landscape/portrait orientation mode of the input interface based on the landscape/portrait orientation status, and an input interface after the switching does not display the target input keys.

In this scenario, the mobile phone performs a conventional landscape/portrait mode switching operation.

314. The mobile phone receives a second wake-up operation.

After the mobile phone stops displaying the target input keys in the input interface after the switching, if the user wants to switch back to the one-handed input mode, the user may perform a wake-up operation in the input interface after the switching. In this way, the mobile phone may receive the second wake-up operation of the user.

It should be noted that, in this embodiment of this application, when the pre-stored wake-up gesture is one gesture, the second wake-up operation is the same as the first wake-up operation. When the pre-stored wake-up gesture includes a plurality of gestures, the second wake-up operation may be the same as or different from the first wake-up operation.

315. The mobile phone displays, in response to the second wake-up operation, the target input keys at the associated position of the second side in the input interface after the switching.

After receiving the second wake-up operation, the mobile phone may display, in response to the second wake-up operation when determining that the mobile phone meets the wake-up condition, the target input keys at the associated position on the second side of the input interface after the switching.

It should be noted that for specific descriptions of the second side, reference may be made to the related descriptions of the second side in step 310. In addition, for specific descriptions of the display type of the floating input box after the switching, refer to the related description of the display type of the floating input box after the switching in step 310. Details are not described herein again in this embodiment of this application.

Figure 19A:
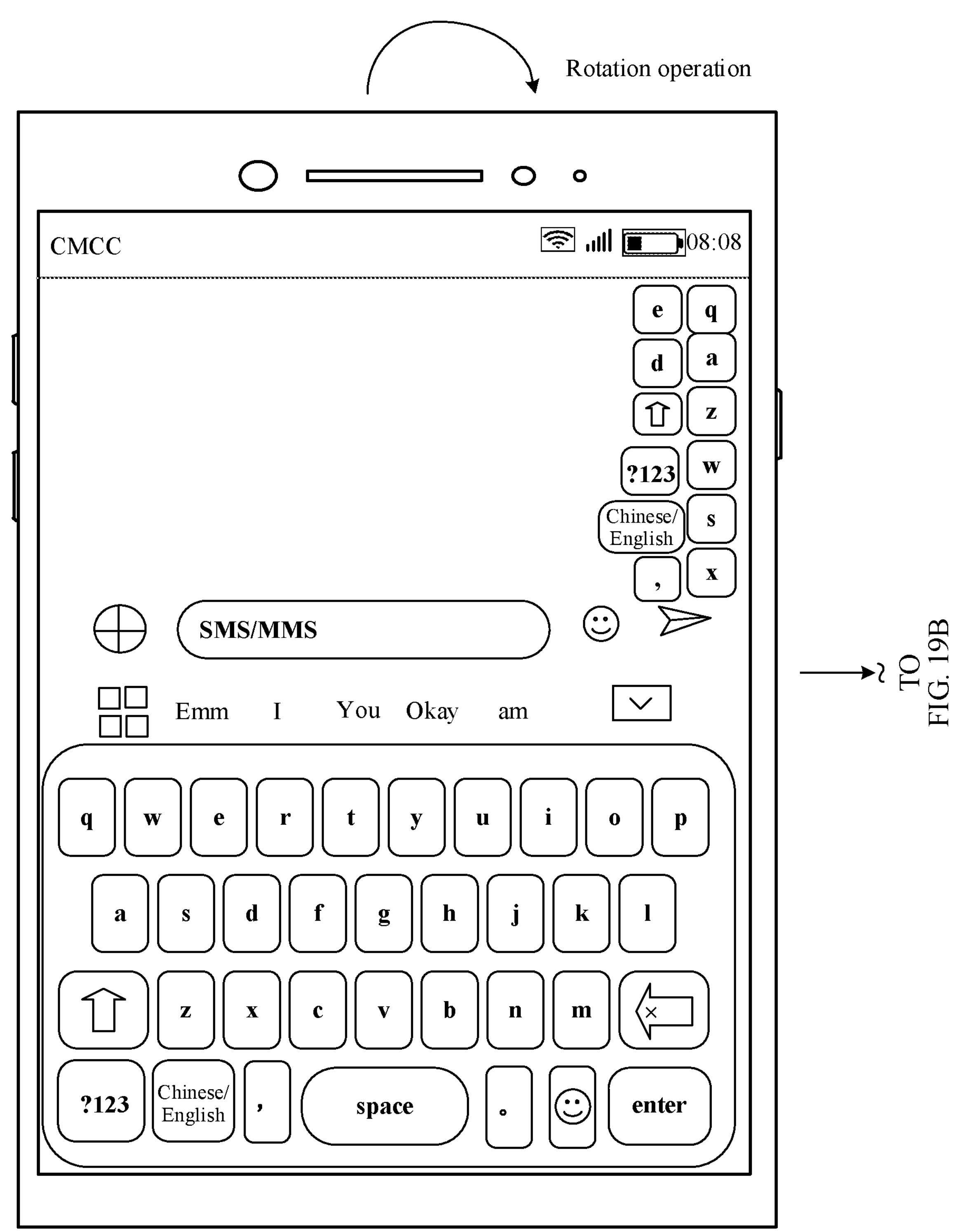
FIG. 19A to FIG. 19C are a schematic diagram 2 of a landscape/portrait orientation switching scenario according to an embodiment of this application.
Figure 19B:
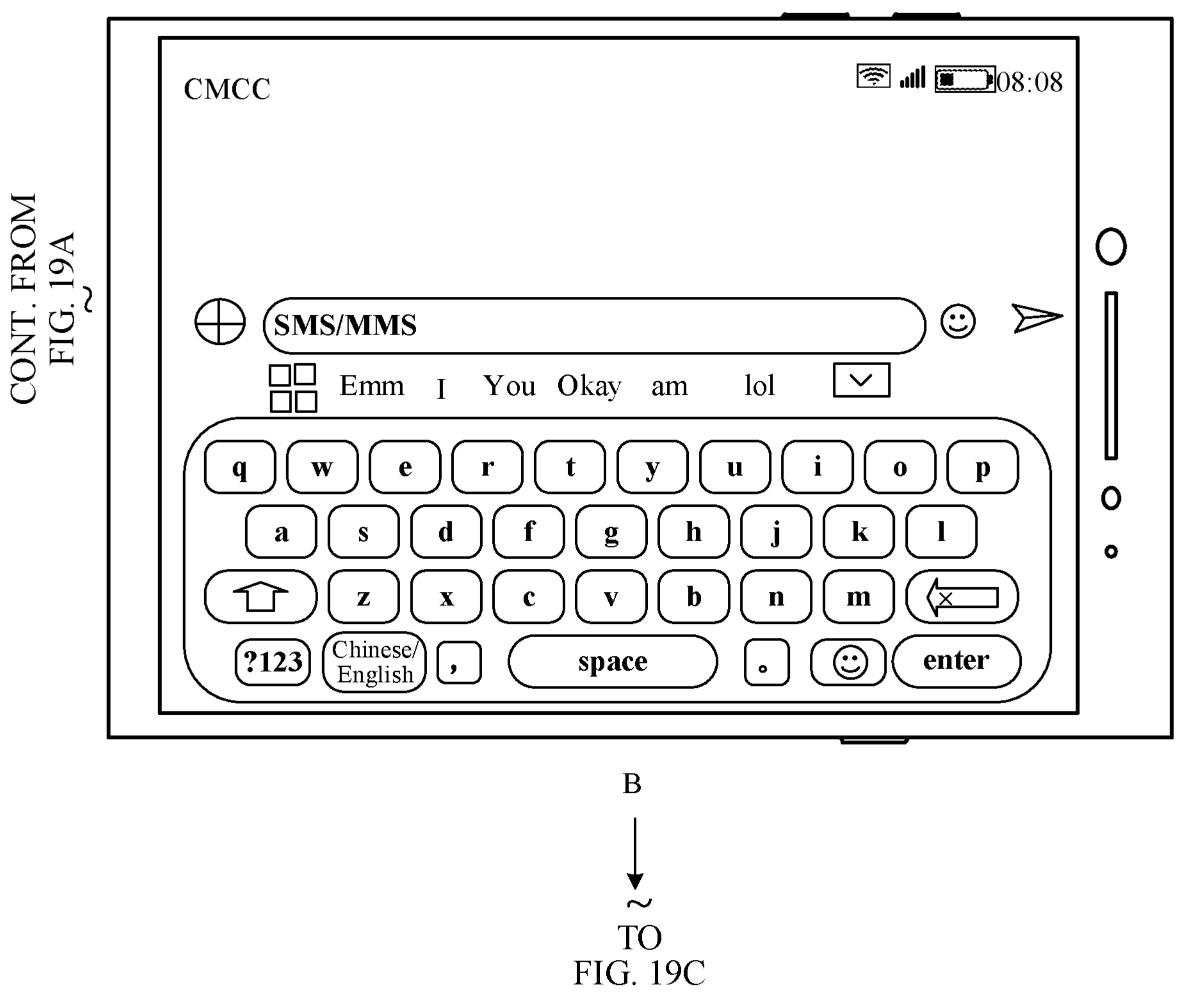
Figures 19B, 19C:
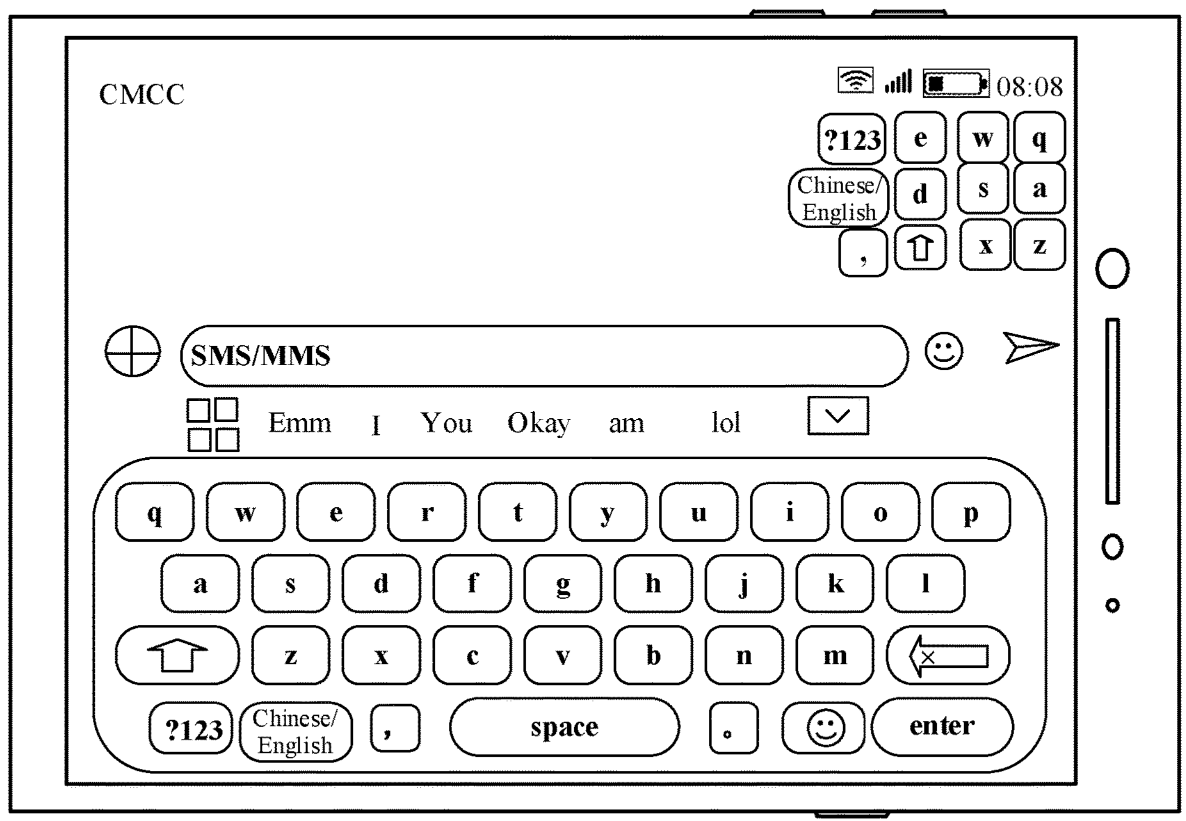

For example, based on FIG. 11B, the mobile phone displays the target input keys in the floating input box at the associated position on the right side of the input interface. The input interface is in the portrait orientation state, and the display type of the floating input box is the two-column display. As shown by FIG. 19A, when the user performs a rotation operation on the mobile phone, and holds still after the rotation operation, the mobile phone determines that the second landscape/portrait orientation switching operation is received. The mobile phone switches the input interface from the portrait orientation state to the landscape orientation state in response to the second landscape/portrait orientation switching operation. As shown in FIG. 19B, the mobile phone displays an input interface in the landscape orientation state after the switching. The input interface does not display the target input key. Assuming that the wake-up gesture is a screen circle drawing gesture, when the user performs a screen circle drawing operation in the input interface shown in FIG. 19B, the mobile phone determines that the second wake-up operation is received, and displays the target input keys in the input interface in the landscape orientation state when determining that the mobile phone meets the wake-up condition. Assuming that a quantity of the target input keys after the switching is the same as that of the target input keys before the switching and a display type of the floating input box after the switching is the four-column display, as shown by FIG. 19C, the mobile phone displays the target input keys in the floating input box at the associated position of the right side in the input interface in the landscape orientation state.

In this way, the mobile phone determines the single-handed/two-handed input mode by using two different landscape/portrait orientation switching operations.

Figure 20:
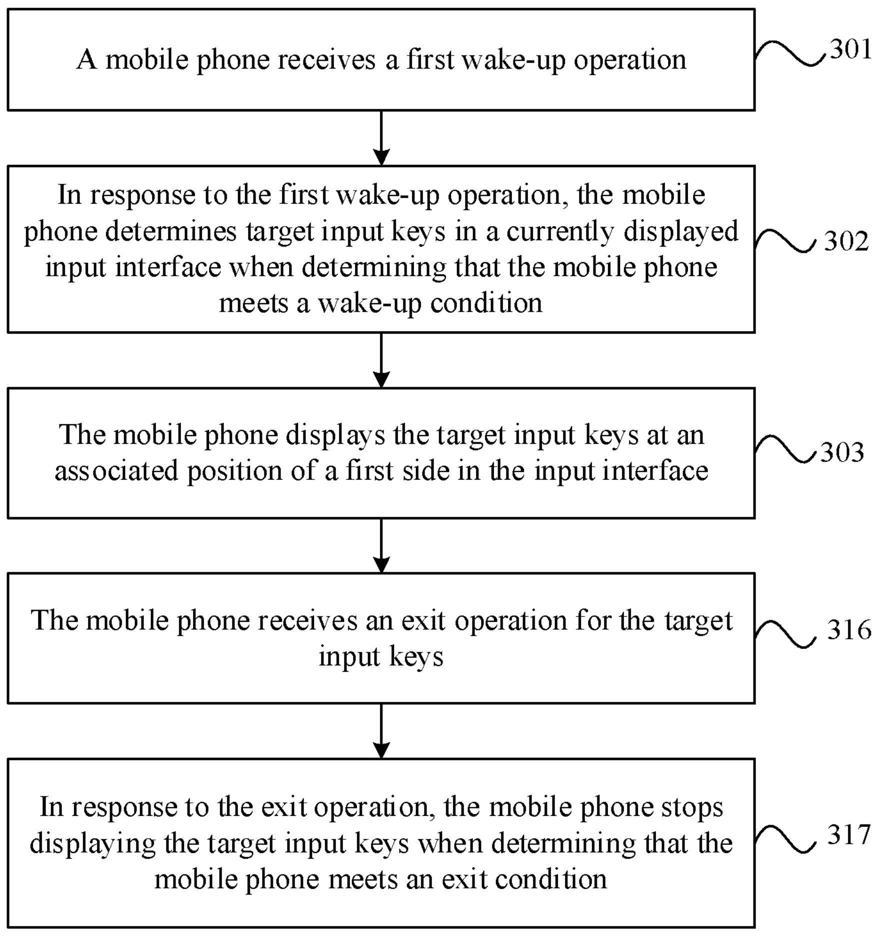
FIG. 20 is a schematic flowchart 6 of an input interface display method according to an embodiment of this application.

In a scenario, after displaying the target input keys in the input interface, the mobile phone may stop displaying the target input keys based on an exit operation. Specifically, based on FIG. 3, as shown in FIG. 20, after step 303 is performed, the input interface display method provided in this embodiment of this application may further include the following step 316 and step 317.

316. The mobile phone receives an exit operation for the target input keys.

The mobile phone may determine, when determining that a gesture used by the user to perform the touch operation on the touchscreen is an exit gesture, that the exit operation for the target input keys is received. The exit gesture may be preset in the mobile phone.

317. In response to the exit operation, the mobile phone stops displaying the target input keys when determining that the mobile phone meets an exit condition.

That the mobile phone stops displaying the target input keys may be specifically deleting the target input keys or hiding the target input keys.

Optionally, in this embodiment of this application, when determining whether the mobile phone meets the exit condition, the mobile phone may obtain a screen display status of the mobile phone, content included in the input interface, and an on/off status of an edge display function. The mobile phone may determine that the mobile phone meets the exit condition when determining that the screen display status is a screen-on state, that the input interface includes the target input keys, and that the on/off status of the edge display function is the on state.

Figure 21A:
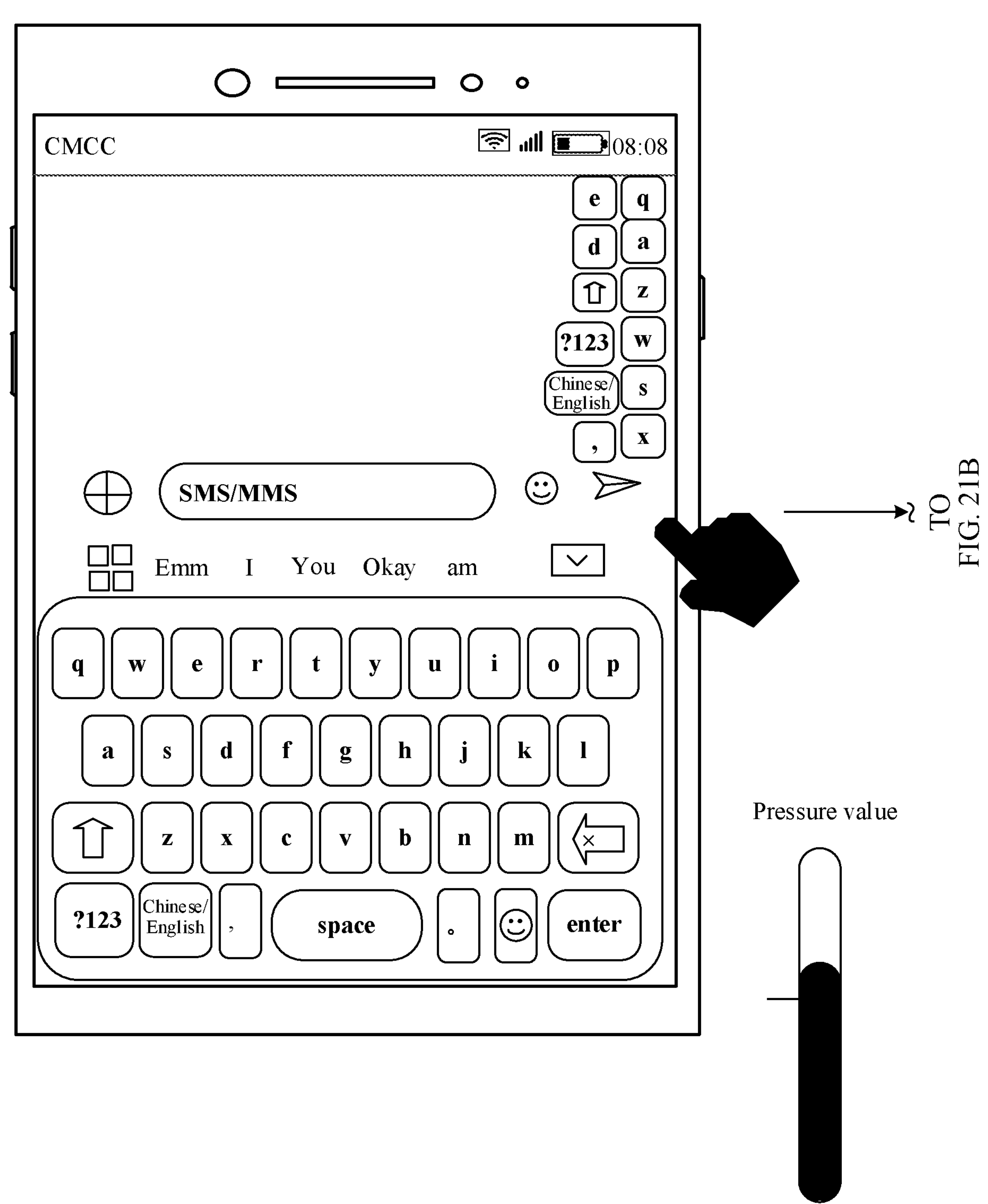
FIG. 21A to FIG. 21C are a schematic diagram of a scenario of stopping displaying target input keys according to an embodiment of this application.
Figure 21B:
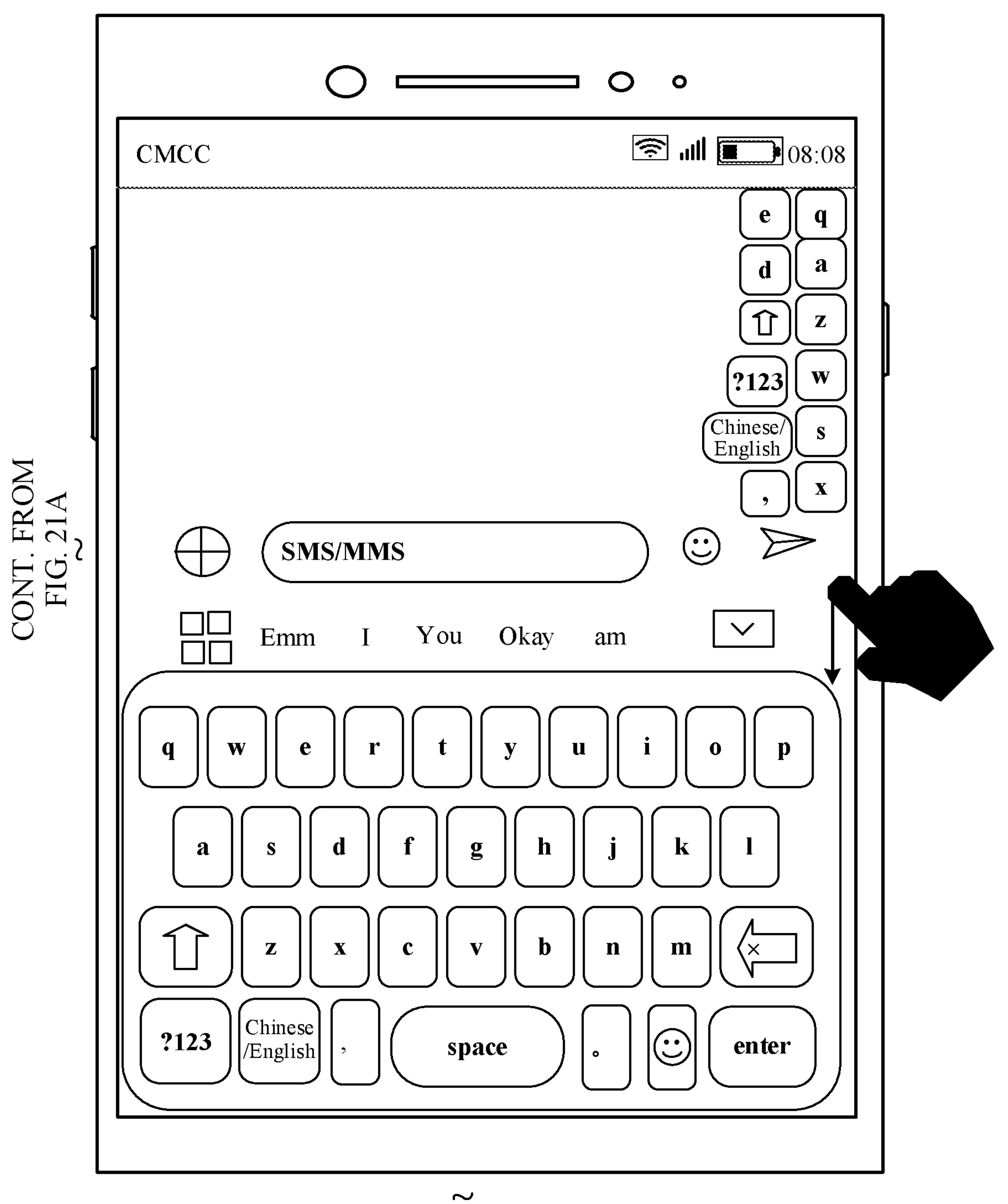
Figure 21C:
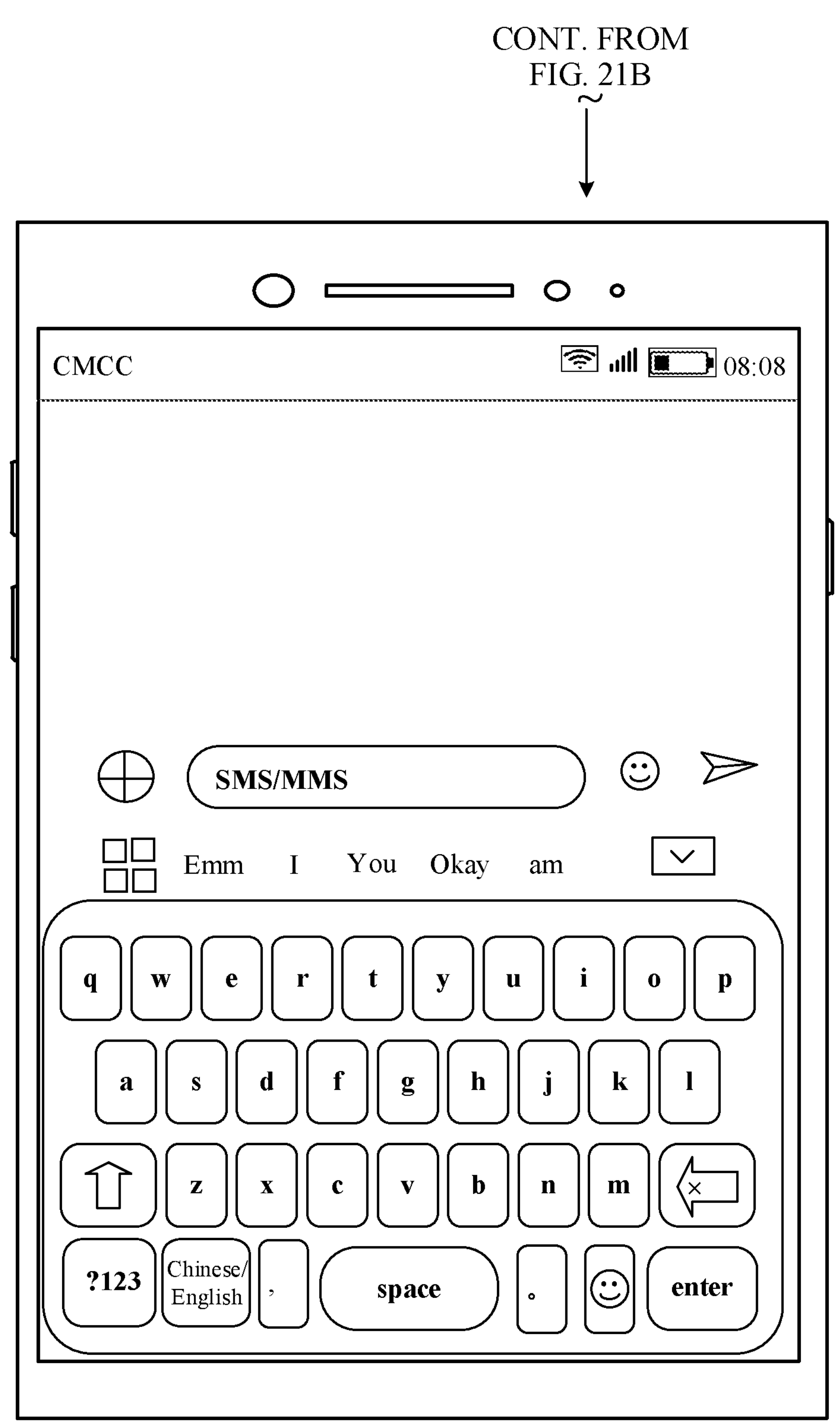

For example, based on FIG. 11B, the mobile phone displays the target input keys in the floating input box at the associated position on the right side of the input interface. Assuming that the exit gesture is a gesture of squeezing the right side edge of the screen and sliding downward, as shown in FIG. 21A, when the user performs a squeeze operation on the right side edge of the input interface, a pressure value reaches the preset threshold. As shown in FIG. 21B, after that, when the user performs a downward sliding operation on the right side of the touchscreen, and a sliding distance reaches the preset threshold, the mobile phone determines that the exit operation is received. The mobile phone stops displaying the target input keys when determining that the mobile phone meets the exit condition. As shown in FIG. 21C, the mobile phone stops displaying the target input keys.

In this way, the user needs only to perform the exit operation to enable the terminal to switch from the one-handed input mode to the two-handed input mode. The operation of the user is simplified and user experience is improved.

The foregoing mainly describes the solutions provided in embodiments of this application from the perspective of the methods. To implement the foregoing functions, corresponding hardware structures and/or software modules for performing the functions are included. A person of ordinary skill in the art should easily be aware that, with reference to algorithm steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 22:
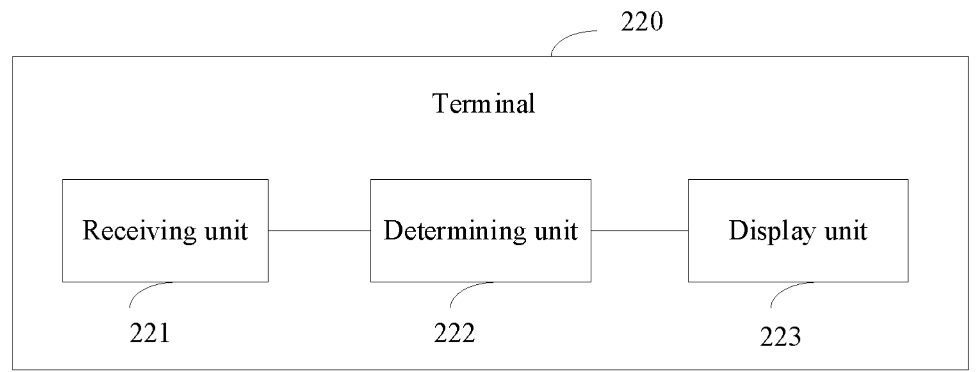
FIG. 22 is a schematic diagram 1 of a structure of a terminal according to an embodiment of this application.

FIG. 22 is a schematic diagram of a structure of a terminal 220 according to an embodiment of this application. The terminal 220 is configured to perform the input interface display method shown in any one of FIG. 3, FIG. 12, FIG. 14, FIG. 16, FIG. 17, and FIG. 20. The terminal 220 may include a receiving unit 221, a determining unit 222, and a display unit 223.

The receiving unit 221 is configured to receive a first wake-up operation. For example, with reference to FIG. 3, the receiving unit 221 may be configured to perform step 301. The determining unit 222 is configured to determine target input keys in a currently displayed input interface in response to the first wake-up operation received by the receiving unit 221 when determining that the terminal 220 meets a wake-up condition. The input interface includes a plurality of input keys. The target input keys include keys whose distances from a first side are greater than a preset distance in the plurality of input keys. The first wake-up operation corresponds to the first side. For example, with reference to FIG. 3, the determining unit 222 may be configured to perform step 302. The display unit 223 is configured to display, at an associated position of the first side in the input interface, the target input keys determined by the determining unit 222. For example, with reference to FIG. 3, the display unit 223 may be configured to perform step 303.

Optionally, the determining unit 222 is specifically configured to obtain a screen display status of the terminal 220, content included in the input interface, and an on/off status of an edge display function, and to determine that the terminal 220 meets the wake-up condition when determining that the screen display status is a screen-on state, that the input interface includes the plurality of input keys and no target input key, and that the on/off status of the edge display function is an on state.

Optionally, the display unit 223 is specifically configured to display the target input keys in a floating input box at the associated position of the first side in the input interface.

Optionally, a display type of the floating input box is at least one of the following: single-column display, multi-column display, arc-shaped display, hollow circle display, semi-circle display, and quarter circle display.

Figure 23:
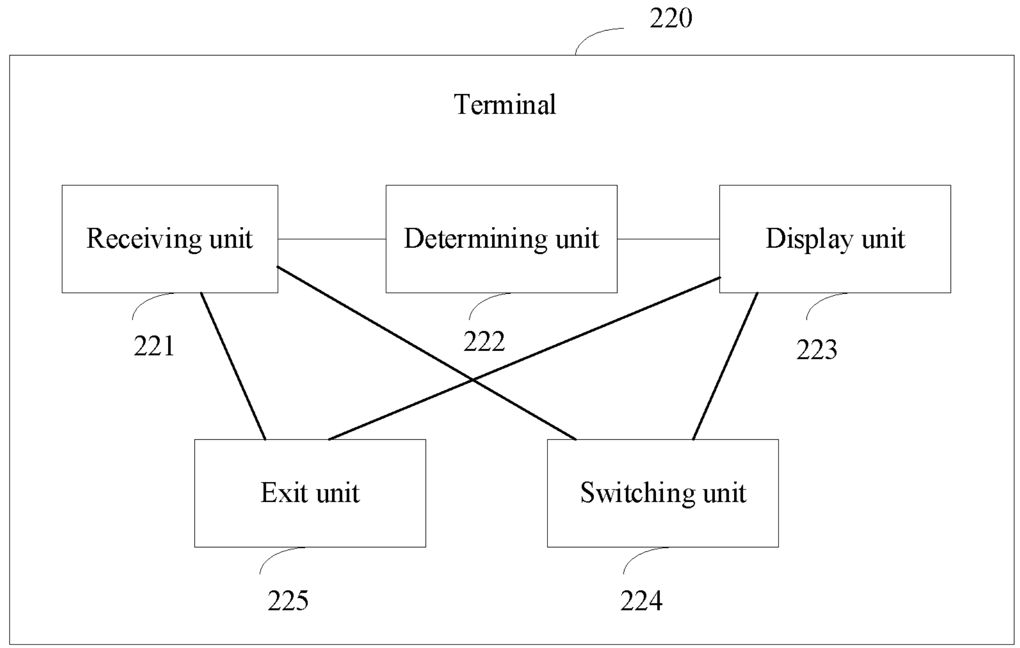
FIG. 23 is a schematic diagram 2 of a structure of a terminal according to an embodiment of this application.

Optionally, as shown in FIG. 23, when the target input keys include a function key, the terminal 220 further includes a switching unit 224.

The receiving unit 221 is further configured to receive a trigger operation for a target function key. For example, with reference to FIG. 12, the receiving unit 221 may be configured to perform step 304. The switching unit 224 is configured to: in response to the trigger operation received by the receiving unit 221, switch the target input keys from a current display style to a target display style, and simultaneously switches the plurality of input keys from the current display style to the target display style. For example, with reference to FIG. 12, the switching unit 224 may be configured to perform step 305.

Optionally, the receiving unit 221 is further configured to receive a first landscape/portrait orientation switching operation. For example, with reference to FIG. 16, the receiving unit 221 may be configured to perform step 308. The determining unit 222 is further configured to determine a current landscape/portrait orientation status of the input interface in response to the first landscape/portrait orientation switching operation received by the receiving unit 221. The landscape/portrait orientation status is a landscape orientation state or a portrait orientation state, and the input interface displays the target input keys. For example, with reference to FIG. 16, the determining unit 222 may be configured to perform step 309. The switching unit 224 is configured to perform an operation of switching a landscape/portrait orientation mode of the input interface based on the landscape/portrait orientation status determined by the determining unit 222. The target input keys are displayed in the input interface after the switching. For example, with reference to FIG. 16, the switching unit 224 may be configured to perform step 310.

Optionally, the receiving unit 221 is further configured to receive a second landscape/portrait orientation switching operation. For example, with reference to FIG. 17, the receiving unit 221 may be configured to perform step 311. The determining unit 222 is further configured to determine a current landscape/portrait orientation status of the input interface in response to the second landscape/portrait orientation switching operation received by the receiving unit 221. The landscape/portrait orientation status is a landscape orientation state or a portrait orientation state, and the input interface displays the target input keys. For example, with reference to FIG. 17, the determining unit 222 may be configured to perform step 312. The switching unit 224 is configured to perform an operation of switching a landscape/portrait orientation mode of the input interface based on the landscape/portrait orientation status determined by the determining unit 222. An input interface after the switching does not display the target input keys. For example, with reference to FIG. 17, the switching unit 224 may be configured to perform step 313. The receiving unit 221 is further configured to receive a second wake-up operation. For example, with reference to FIG. 17, the receiving unit 221 may be configured to perform step 314. The display unit 223 is further configured to display, in response to the second wake-up operation received by the receiving unit 221, the target input keys at an associated position of the second side in the input interface after the switching. The second wake-up operation corresponds to the second side. For example, with reference to FIG. 17, the display unit 223 may be configured to perform step 315.

Optionally, as shown in FIG. 23, after displaying the target input keys, the terminal 220 further includes an exit unit 225.

The receiving unit 221 is further configured to receive an exit operation for the target input key. For example, with reference to FIG. 20, the receiving unit 221 may be configured to perform step 316. The determining unit 222 is further configured to determine, in response to the exit operation received by the receiving unit 221, that the terminal 220 meets an exit condition. The exit unit 225 is configured to stop displaying the target input keys when the determining unit 222 determines that the terminal 220 meets the exit condition. For example, with reference to FIG. 20, the exit unit 225 may be configured to perform step 317.

Optionally, the determining unit 222 is specifically configured to obtain a screen display status of the terminal 220, content included in the input interface, and an on/off status of an edge display function, and to determine that the terminal 220 meets the exit condition when determining that the screen display status is a screen-on state, that the input interface includes the target input keys, and that the on/off status of the edge display function is the on state.

Optionally, after the target input keys are displayed, the receiving unit 221 is further configured to receive a position switching operation. For example, with reference to FIG. 14, the receiving unit 221 may be configured to perform step 306. The switching unit 224 is configured to switch, in response to the position switching operation received by the receiving unit 221, the target input keys from the associated position of the first side to an associated position of a third side. The third side is another side of the terminal 220 other than the first side, and the position switching operation corresponds to the third side. For example, with reference to FIG. 14, the switching unit 224 may be configured to perform step 307.

Certainly, the terminal 220 provided in this embodiment of this application includes but is not limited to the foregoing modules.

During actual implementation, the determining unit 222, the switching unit 224, and the exit unit 225 may be implemented by the processor 201 shown in FIG. 2 by calling program code in the memory 203. For a specific execution process, refer to the description of the input interface display method shown in FIG. 3, FIG. 12, FIG. 14, FIG. 16, FIG. 17, or FIG. 20. Details are not described herein again.

Another embodiment of this application further provides a computer-readable storage medium. The computer-readable storage medium stores computer instructions. When the computer instructions are run on a terminal, the terminal is enabled to perform the steps performed by the terminal in the method procedures shown in the foregoing method embodiments.

Another embodiment of this application further provides a chip system. The chip system is applied to a terminal. The chip system includes one or more interface circuits and one or more processors. The interface circuit and the processor are interconnected by using a line. The interface circuit is configured to receive a signal from a memory of the terminal, and send the signal to the processor. The signal includes computer instructions stored in the memory. When the processor executes the computer instructions, the terminal performs the steps performed by the terminal in the method procedures shown in the foregoing method embodiments.

In another embodiment of this application, a computer program product is further provided. The computer program product includes computer instructions. When the computer instructions are run on a terminal, the terminal is enabled to perform the steps performed by the terminal in the method procedures shown in the foregoing method embodiments.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer-executable instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible to a computer, or a data storage device, such as a server or a data center, integrating one or more available media. The usable medium may be a magnetic medium (for example, a floppy disk, a hard disk, or magnetic tape), an optical medium (for example, a DVD), a semiconductor medium (for example, a solid-state drive (SSD)), or the like.

The foregoing descriptions are merely specific implementations of this application. Any variation or replacement readily figured out by a person skilled in the art based on the specific implementations provided in this application shall fall within the protection scope of this application.

What is claimed is:

1. A method, comprising:

detecting, by a terminal, a first wake-up operation, wherein the first wake-up operation enables switching the terminal to a one-handed input mode;

in response to the first wake-up operation, identifying partial input keys of a soft keyboard in a first input interface based on identifying that the terminal meets a wake-up condition, wherein the first input interface is a currently displayed interface; and displaying the partial input keys in a second input interface concurrently with and separately from the soft keyboard displayed in the first input interface.

2. The method according to claim 1, wherein the identifying that the terminal meets the wake-up condition comprises:

obtaining a screen display status of the terminal, content in the first input interface, and an on/off status of an edge display function from a setting configuration, the on/off status indicating whether displaying the partial input keys in the second input interface is allowed; and identifying that the terminal meets the wake-up condition based on identifying that the screen display status is a screen-on state, based on identifying that the first input interface comprises the soft keyboard and does not comprise the second input interface displaying the partial input keys, and based on identifying that the on/off status of the edge display function is an on state.

3. The method according to claim 1, wherein the displaying the partial input keys comprises:

displaying the partial input keys in a floating input box at an associated position of a first side in the second input interface.

4. The method according to claim 3, wherein a display type of the floating input box is at least one of: single-column display, multi-column display, arc-shaped display, hollow circle display, semi-circle display, or quarter circle display.

5. The method according to claim 1, wherein the partial input keys comprise a function key, and the method further comprises:

detecting a trigger operation for a target function key, wherein the target function key is any function key in the partial input keys; and in response to the trigger operation, switching the partial input keys from a current display style to a target display style, and simultaneously switching the soft keyboard from the current display style to the target display style.

6. The method according to claim 1, wherein the method further comprises:

detecting a first landscape/portrait orientation switching operation;

identifying a current landscape/portrait orientation status of the first input interface in response to the first landscape/portrait orientation switching operation, wherein the current landscape/portrait orientation status is a landscape orientation state or a portrait orientation state, and the first input interface displays the partial input keys; and performing an operation of switching a landscape/portrait orientation mode of the first input interface based on the current landscape/portrait orientation status, wherein an input interface after the switching displays the partial input keys.

7. The method according to claim 1, wherein the method further comprises:

detecting a second landscape/portrait orientation switching operation;

identifying a current landscape/portrait orientation status of the first input interface in response to the second landscape/portrait orientation switching operation, wherein the current landscape/portrait orientation status is a landscape orientation state or a portrait orientation state, and the first input interface displays the partial input keys;

performing an operation of switching a landscape/portrait orientation mode of the first input interface based on the current landscape/portrait orientation status, wherein a third input interface after the switching does not display the partial input keys;

detecting a second wake-up operation; and in response to the second wake-up operation, displaying the partial input keys at a second associated position of a third side in the third input interface after the switching, wherein the second wake-up operation corresponds to a second side of the terminal.

8. The method according to claim 1, wherein the method further comprises:

after the displaying the partial input keys:

detecting an exit operation for the partial input keys; and in response to the exit operation, stopping, based on identifying that the terminal meets an exit condition, displaying the partial input keys.

9. The method according to claim 8, wherein the identifying that the terminal meets the exit condition comprises:

obtaining a screen display status of the terminal, content in the first input interface, and an on/off status of an edge display function from a setting configuration, the on/off status indicating whether displaying the partial input keys in the second input interface is allowed; and identifying that the terminal meets the exit condition based on identifying that the screen display status is a screen-on state, based on identifying that the first input interface comprises the partial input keys, and based on identifying that the on/off status of the edge display function is an on state.

10. The method according to claim 1, wherein the method further comprises:

after the displaying the partial input keys:

detecting a position switching operation; and in response to the position switching operation, switching the partial input keys from an associated position of a first side of the terminal to a third associated position of a third side of the terminal, wherein the third side is different from the first side, and the position switching operation corresponds to the third side.

11. A terminal comprising:

at least one processor; and a non-transitory computer readable medium storing computer-executable instructions that, when executed by the at least one processor, cause the terminal to perform operations comprising:

detecting a first wake-up operation, wherein the first wake-up operation enables switching the terminal to a one-handed input mode;

in response to the first wake-up operation, identifying partial input keys of a soft keyboard in a first input interface based on identifying that the terminal meets a wake-up condition, wherein the first input interface is a currently displayed interface; and displaying the partial input keys in a second input interface concurrently with and separately from the soft keyboard displayed in the first input interface.

12. The terminal according to claim 11, wherein the identifying that the terminal meets the wake-up condition comprises:

obtaining a screen display status of the terminal, content in the first input interface, and an on/off status of an edge display function from a setting configuration, the on/off status indicating whether displaying the partial input keys in the second input interface is allowed; and identifying that the terminal meets the wake-up condition based on identifying that the screen display status is a screen-on state, based on identifying that the first input interface comprises the soft keyboard and does not comprise the second input interface displaying the partial input keys, and based on identifying that the on/off status of the edge display function is an on state.

13. The terminal according to claim 11, wherein the displaying the partial input keys comprises:

displaying the partial input keys in a floating input box at an associated position of a first side in the second input interface.

14. The terminal according to claim 13, wherein a display type of the floating input box is at least one of: single-column display, multi-column display, arc-shaped display, hollow circle display, semi-circle display, or quarter circle display.

15. The terminal according to claim 11, wherein the partial input keys comprise a function key, the operations further comprising:

detecting a trigger operation for a target function key, wherein the target function key is any function key in the partial input keys; and in response to the trigger operation, switching the partial input keys from a current display style to a target display style, and simultaneously switching the soft keyboard from the current display style to the target display style.

16. The terminal according to claim 11, the operations further comprising:

detecting a first landscape/portrait orientation switching operation;

identifying a current landscape/portrait orientation status of the first input interface in response to the first landscape/portrait orientation switching operation, wherein the current landscape/portrait orientation status is a landscape orientation state or a portrait orientation state, and the first input interface displays the partial input keys; and performing an operation of switching a landscape/portrait orientation mode of the first input interface based on the current landscape/portrait orientation status, wherein an input interface after the switching displays the partial input keys.

17. The terminal according to claim 11, the operations further comprising:

detecting a second landscape/portrait orientation switching operation;

identifying a current landscape/portrait orientation status of the first input interface in response to the second landscape/portrait orientation switching operation, wherein the current landscape/portrait orientation status is a landscape orientation state or a portrait orientation state, and the first input interface displays the partial input keys;

performing an operation of switching a landscape/portrait orientation mode of the first input interface based on the current landscape/portrait orientation status, wherein a third input interface after the switching does not display the partial input keys;

detecting a second wake-up operation; and in response to the second wake-up operation, displaying the partial input keys at a second associated position of a third side in the third input interface after the switching, wherein the second wake-up operation corresponds to a second side of the terminal.

18. The terminal according to claim 11, the operations further comprising:

after the displaying the partial input keys:

detecting an exit operation for the partial input keys; and in response to the exit operation, stopping, based on identifying that the terminal meets an exit condition, displaying the partial input keys.

19. A non-transitory computer-readable storage medium storing computer instructions, wherein when the computer instructions are run on a terminal, the terminal is enabled to perform operations comprising:

detecting a first wake-up operation, wherein the first wake-up operation enables switching the terminal to a one-handed input mode;

in response to the first wake-up operation, identifying partial input keys of a soft keyboard in a first input interface based on identifying that the terminal meets a wake-up condition, wherein the first input interface is a currently displayed interface; and displaying the partial input keys in a second input interface concurrently with and separately from the soft keyboard displayed in the first input interface.

20. The method according to claim 1, wherein the first input interface does not overlap the second input interface, wherein the partial input keys displayed in the second input interface have a different key position arrangement than the partial input keys displayed in the first input interface, wherein distances of the partial input keys from a first side of the terminal are greater than a preset distance, and wherein the first wake-up operation corresponds to the first side.

* * * * *